United States Patent
Lee et al.

(10) Patent No.: US 10,771,205 B2
(45) Date of Patent: Sep. 8, 2020

(54) METHOD AND DEVICE FOR PERFORMING COMMUNICATION BY USING NON-ORTHOGONAL CODE MULTIPLE ACCESS SCHEME IN WIRELESS COMMUNICATION SYSTEM

(71) Applicant: LG Electronics Inc., Seoul (KR)

(72) Inventors: Hojae Lee, Seoul (KR); Sangrim Lee, Seoul (KR); Kijun Kim, Seoul (KR); Byounghoon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/323,586

(22) PCT Filed: Jul. 27, 2017

(86) PCT No.: PCT/KR2017/008127
§ 371 (c)(1),
(2) Date: Feb. 6, 2019

(87) PCT Pub. No.: WO2018/030685
PCT Pub. Date: Feb. 15, 2018

(65) Prior Publication Data
US 2019/0181993 A1    Jun. 13, 2019

Related U.S. Application Data

(60) Provisional application No. 62/374,021, filed on Aug. 12, 2016.

(51) Int. Cl.
*H04L 5/00* (2006.01)
*H04L 27/18* (2006.01)
(Continued)

(52) U.S. Cl.
CPC ........ *H04L 5/0016* (2013.01); *H04J 13/0003* (2013.01); *H04J 13/10* (2013.01);
(Continued)

(58) Field of Classification Search
CPC ........ H04J 13/0003; H04J 13/10; H04J 13/16; H04L 27/18
See application file for complete search history.

(56) References Cited

U.S. PATENT DOCUMENTS

| 8,059,747 B1 | 11/2011 | Orlik et al. |
| 2008/0108310 A1 * | 5/2008 | Tong ................... H04B 7/0478 455/69 |

(Continued)

FOREIGN PATENT DOCUMENTS

WO    2015084070    6/2015

*Primary Examiner* — Jael M Ulysse
(74) *Attorney, Agent, or Firm* — Dentons US LLP

(57) ABSTRACT

A method and a device for performing communication by using a non-orthogonal code multiple access scheme in a wireless communication system are provided. Particularly, a terminal receives control information from a base station. The terminal modulates or demodulates a terminal-specific NCC on the basis of the control information. The terminal performs the non-orthogonal code multiple access scheme by using the terminal-specific NCC. The control information includes information on a codeword composed of a Grassmannian sequence. The codeword is included in a codebook predefined for the non-orthogonal code multiple access scheme. Each coefficient of the Grassmannian sequence is quantized on the basis of an M-quadrature amplitude modulation (M-QAM) constellation.

13 Claims, 23 Drawing Sheets

(51) Int. Cl.
*H04L 27/34* (2006.01)
*H04J 13/00* (2011.01)
*H04J 13/10* (2011.01)
*H04J 13/16* (2011.01)
*H04W 72/04* (2009.01)

(52) U.S. Cl.
CPC .............. *H04J 13/16* (2013.01); *H04L 27/18* (2013.01); *H04L 27/34* (2013.01); *H04W 72/042* (2013.01); *H04W 72/044* (2013.01); *H04J 2013/165* (2013.01)

(56) References Cited

U.S. PATENT DOCUMENTS

| | | | | |
|---|---|---|---|---|
| 2008/0212461 A1* | 9/2008 | Pande | ................... | H04L 5/0023 370/203 |
| 2011/0255635 A1* | 10/2011 | Lee, II | ................ | H04B 7/0413 375/295 |
| 2012/0147989 A1* | 6/2012 | Murakami | ........ | H04L 25/03305 375/295 |
| 2012/0213196 A1* | 8/2012 | Chung | ................. | H04W 74/08 370/330 |
| 2012/0300741 A1* | 11/2012 | Han | .................... | H04L 27/2634 370/329 |
| 2013/0265926 A1* | 10/2013 | Stein | ................... | H04L 25/0236 370/312 |
| 2013/0287064 A1* | 10/2013 | Seo | ....................... | H04L 5/0073 375/144 |
| 2014/0169300 A1* | 6/2014 | Kim | .................. | H04W 72/0413 370/329 |
| 2015/0016395 A1* | 1/2015 | Papasakellariou | .......................... | H04B 1/70718 370/329 |
| 2015/0230118 A1* | 8/2015 | Lim | ..................... | H04L 1/0026 370/252 |
| 2015/0280884 A1* | 10/2015 | Choi | ................... | H04L 25/0391 370/329 |
| 2015/0318970 A1* | 11/2015 | Fouad | ................ | H04L 27/2634 370/252 |
| 2016/0006515 A1* | 1/2016 | Kojima | ............... | H04B 10/508 398/193 |
| 2016/0066345 A1* | 3/2016 | Sun | .................... | H04W 72/121 370/329 |
| 2016/0112995 A1* | 4/2016 | Chen | .................. | H04W 72/042 370/329 |
| 2016/0309542 A1* | 10/2016 | Kowalski | ........... | H03M 13/353 |
| 2017/0048841 A1* | 2/2017 | Hwang | ............... | H04B 7/0452 |

* cited by examiner

METHOD AND DEVICE FOR PERFORMING COMMUNICATION BY USING NON-ORTHOGONAL CODE MULTIPLE ACCESS SCHEME IN WIRELESS COMMUNICATION SYSTEM

CROSS-REFERENCE TO RELATED APPLICATIONS

This application is the National Stage filing under 35 U.S.C. 371 of International Application No. PCT/KR2017/008127, filed on Jul. 27, 2017, which claims the benefit of U.S. Provisional Application No. 62/374,021 filed on Aug. 12, 2016, the contents of which are all hereby incorporated by reference herein in their entirety.

BACKGROUND OF THE INVENTION

Field of the Invention

The present specification relates to wireless communication, and more particularly, to a method of performing communication by using a non-orthogonal coded multiple access scheme, and a device using the method.

Related Art

A wireless communication system is widely deployed to provide various types of communication services, such as voice and data. An object of a wireless communication system is to enable a plurality of UEs to perform reliable communication regardless of their locations and mobility.

In general, a wireless communication system is a multiple access system capable of supporting communication with a plurality of UEs by sharing available radio resources. Examples of radio resources include time, a frequency, code, transmission power and so on. Examples of a multiple access system includes a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system and so on.

A requirement of a next-generation wireless communication system is to accommodate significantly explosive data traffic, to increase a dramatic increase in a transfer rate per user, to accommodate the significantly increased number of connected devices, and to support a very low end-to-end (E2E) latency and high energy efficiency. For this, there is ongoing research on various techniques such as dual connectivity, massive multiple input multiple output (MIMO), in-band full duplex, non-orthogonal multiple access (NOMA), super wideband support, device networking, or the like.

SUMMARY OF THE INVENTION

The present specification provides a method and apparatus for performing communication by using a non-orthogonal coded multiple access scheme in a wireless communication system.

The present specification proposes a method and apparatus for performing communication by using a non-orthogonal coded multiple access in a wireless communication system.

The apparatus includes a radio frequency (RF) unit transmitting and receiving a radio signal and a processor operatively coupled to the RF unit.

First, terminologies will be summarized. A quantized non-orthogonal codebook may correspond to a Grassmannian sequence. Since a codebook used in the conventional NCMA scheme is expressed by a coefficient of a complex form as a codeword for solving a Grassmannian line packing problem, a great number of bits are required. However, the present embodiment proposes a scheme capable of expressing a coefficient only with a small number of bits while maintaining characteristics of the Grassmannian sequence by using a quantized non-orthogonal codebook.

A UE receives control information from an eNB. The control information includes information on a codeword configured of a Grassmannian sequence. The codeword is included in a codebook predefined for the non-orthogonal coded multiple access scheme. That is, the predefined codebook may correspond to a non-orthogonal codebook predefined between the UE and the eNB.

The control information may further include a codebook index corresponding to a UE specific non-orthogonal code cover (NCC), a codeword index in a corresponding codebook, and an MCS level.

If the wireless communication system performs downlink communication, the control information may be transmitted through a PDCCH. If the wireless communication system performs uplink communication, the control information may be transmitted through a UL scheduling grant. Alternatively, the control information may be informed through a higher layer signal or the like at an RRC level. Alternatively, the control information may be pre-agreed in a transmitting/receiving side according to a pre-agreed rule. For example, the pre-agreed rule may be a rule by which a UE specific NCC index can be recognized with a modulo operation of K and C-RNTI information of the UE when a superposition coefficient K of the entire codebook is fixedly used or is known through a broadcast channel or the like. For example, NCC Index(k) of a kth UE may be mod(C-RNTI(k), K).

Each coefficient of the Grassmannian sequence may be quantized on the basis of M-quadrature amplitude modulation (QAM) constellation. M is a quantization level.

The quantization scheme is described in detail as follows. The quantized Grassmannian sequence may be generated by quantizing each coefficient of the Grassmannian sequence in an In-phase Quadrature-phase (IQ) domain with the M-QAM constellation having a minimum Euclidean distance with respect to each coefficient of the Grassmannian sequence.

In addition, before being quantized with the M-QAM constellation, the Grassmannian sequence may be scaled with a mean value of a magnitude of the M-QAM constellation and may be normalized with a mean value of a magnitude of each coefficient of the codeword. That is, a mean value of a magnitude of all coefficients of the Grassmannian sequence and a mean value of a magnitude of M-QAM constellation are quantized in the same level. Each coefficient of the Grassmannian sequence subjected to the scaling and normalization process may be independently quantized.

In addition, the Grassmannian sequence has the following characteristics.

The Grassmannian sequence may be included in a sequence set which maximizes a chordal distance formed by two random vectors in the same subspace, a sequence set of which cross-correlation between sequences is equally maintained, and a non-constant-modulus sequence set. That is, the Grassmannian sequence has characteristics of all of the three types of sequences sets. Even if the Grassmannian sequence is quantized, the characteristic of the Grassmannian sequence is maintained intactly.

The quantized Grassmannian sequence may correspond to a codebook C configured in an (N×K) dimension. N may be a spreading factor, and K may be a superposition factor. K may correspond to the number of UEs corresponding to the multiple access scheme.

The quantized Grassmannian sequence may be expressed in a specific codebook form as follows by considering M, N, and K.

The quantized Grassmannian sequence may be expressed with a first matrix as follows, when M is 64, N is 2, and K is 2.

$$\begin{bmatrix} 5+5i & 5+5i \\ 5+5i & -5-5i \end{bmatrix} * P_{no,2,2}$$

In addition, the quantized Grassmannian sequence may be expressed with a second matrix as follows, when M is 64, N is 2, and K is 4.

$$\begin{bmatrix} -3+5i & -3+7i & -1-3i & -7-3i \\ 7-3i & -3+1i & 7-3i & 5+3i \end{bmatrix} * P_{no,2,4}$$

In addition, the quantized Grassmannian sequence may be expressed with a third matrix as follows, when M is 64, N is 2, and K is 6.

$$\begin{bmatrix} -3+1i & -7-3i & -1-5i & -5+3i & -1-7i & -7+1i \\ 7-3i & -5+3i & -1-7i & -5-5i & -1-1i & 3-3i \end{bmatrix} * P_{no,2,6}$$

In addition, the quantized Grassmannian sequence may be expressed with a fourth matrix as follows, when M is 64, N is 2, and K is 8.

$$\begin{bmatrix} -3-7i & -7-1i & -3-1i & -1-5i \\ -3-1i & -7+1i & -3-7i & 1+5i \\ -1-3i & 1-5i & -1+7i & -5-7i \\ 1-7i & 3+1i & -5+1i & -1-7i \end{bmatrix} * P_{no,2,8}$$

In addition, the quantized Grassmannian sequence may be expressed with a fifth matrix as follows, when M is 64, N is 4, and K is 4.

$$\begin{bmatrix} 5+5i & 5+5i & 5+5i & 5+5i \\ 5+5i & -5-5i & 5+5i & -5-5i \\ 5+5i & 5+5i & -5-5i & -5-5i \\ 5+5i & -5-5i & -5-5i & 5+5i \end{bmatrix} * P_{no,4,4}$$

In addition, the quantized Grassmannian sequence may be expressed with a sixth matrix as follows, when M is 64, N is 4, and K is 6.

$$\begin{bmatrix} -7+3i & -3+1i & -1-7i & -1+1i & -7+5i & -3+1i \\ -5+1i & -1-5i & -3+1i & 3+5i & -3-7i & 5+7i \\ 3+1i & -1-7i & -1-3i & -1+7i & 3+3i & 5-7i \\ 1-7i & -7+3i & -3+1i & -5+5i & -1+3i & 1+3i \end{bmatrix} * P_{no,4,6}$$

In addition, the quantized Grassmannian sequence may be expressed with a seventh matrix as follows, when M is 64, N is 4, and K is 8.

$$\begin{bmatrix} -5-3i & -7+1i & -1-3i & -7-3i \\ -1-3i & -5-3i & -5-3i & -7+7i \\ 1-5i & 1+3i & -7+7i & 5-1i \\ 7-3i & 3+1i & -1+5i & -5+5i \\ -7-3i & 1-7i & -1+3i & 7+1i \\ -5+7i & -3-5i & -5+3i & -1-1i \\ 1-3i & 1-7i & -5+7i & -3+5i \\ 1+1i & -7+7i & 7-5i & 3+1i \end{bmatrix} * P_{no,4,8}$$

$P_{no,N,K}$ is a normalized matrix for power constraints and is expressed as follows.

$$P_{no,N,K} = \begin{bmatrix} P_{no,1} & 0 & 0 & 0 \\ 0 & P_{no,2} & 0 & 0 \\ 0 & 0 & \ddots & 0 \\ 0 & 0 & 0 & P_{no,K} \end{bmatrix}$$

$P_{no,K}$ may be expressed as follows.

$P_{no,k} = (1/|c^{(k)}|) \times \sqrt{N}$, for $k=1, \ldots, K$.

c may correspond to a column vector of the first to seventh matrixes.

Herein, the first to seventh matrixes may correspond to the codebook C.

The UE modulates or demodulates a UE specific non-orthogonal code cover (NCC) on the basis of the control information.

If the wireless communication system performs downlink communication, the UE may demodulate the UE specific NCC through a codebook index and codeword index included in the control information. If the wireless communication system performs uplink communication, the UE may modulate the UE specific NCC through the codebook index and codeword index included in the control information.

The UE performs the non-orthogonal coded multiple access scheme by using the UE specific NCC.

The performing, by the UE, the non-orthogonal coded multiple access scheme by using the UE specific NCC may include receiving, by the UE, data of multiple UEs in the same time frequency resources by using the UE specific NCC if the wireless communication system performs downlink communication.

In addition, the performing, by the UE, the non-orthogonal coded multiple access scheme by using the UE specific NCC may include transmitting, by the UE, data of multiple UEs in the same time frequency resource by using the UE specific NCC if the wireless communication system performs uplink communication.

In addition, if the eNB supports multiple cells, some sequences out of the quantized Grassmannian sequences may be used only for a specific cell out of the multiple cells.

In a state where the Grassmannian sequence is generated as G(4, 18), 3 cells may perform a NoMA service by selecting only 6 sequences from G(4, 18). Accordingly, cross-correlation in a single cell may be more increased than G(4,6). However, since cross-correlation between sequences used between cells can be maintained, inter-cell interference can be decreased.

A coefficient of a sequence can be expressed with a smaller number of bits by using the proposed scheme, while maintaining a low cross-correlation characteristic of a non-orthogonal codeword of non-orthogonal coded multiple access (NCMA) scheme.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink.

For clarity of explanation, the following description will focus on the 3GPP LTE/LTE-A. However, technical features of the present invention are not limited thereto.

Figure 1:
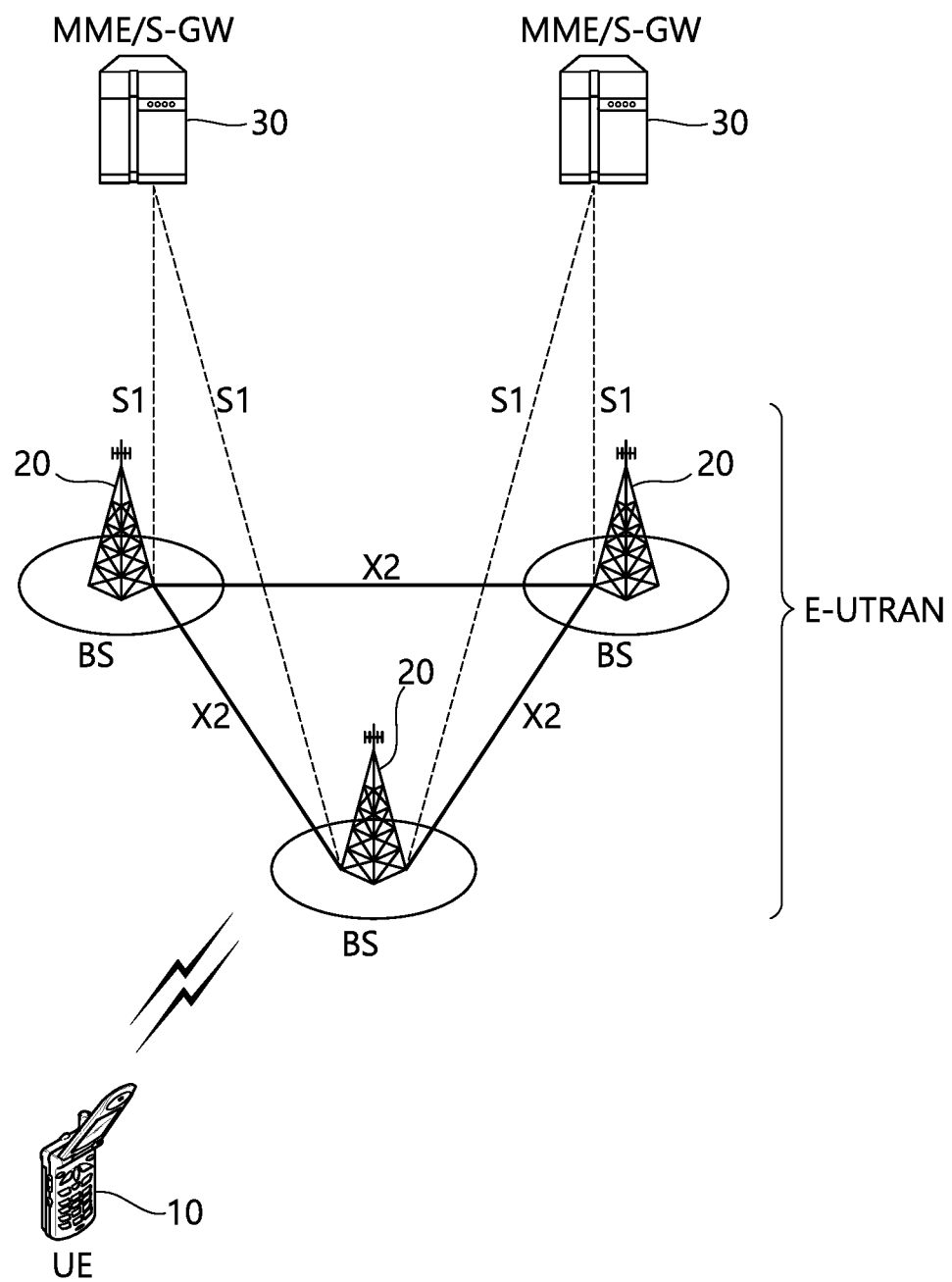
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

A radio interface between the UE and the BS is called a Uu interface. Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
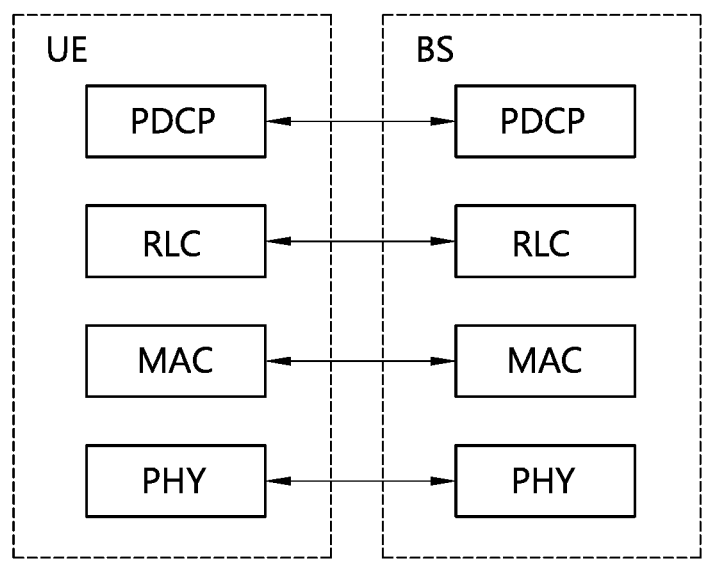
FIG. 2 is a diagram illustrating a radio protocol architecture for a user plane.
Figure 3:
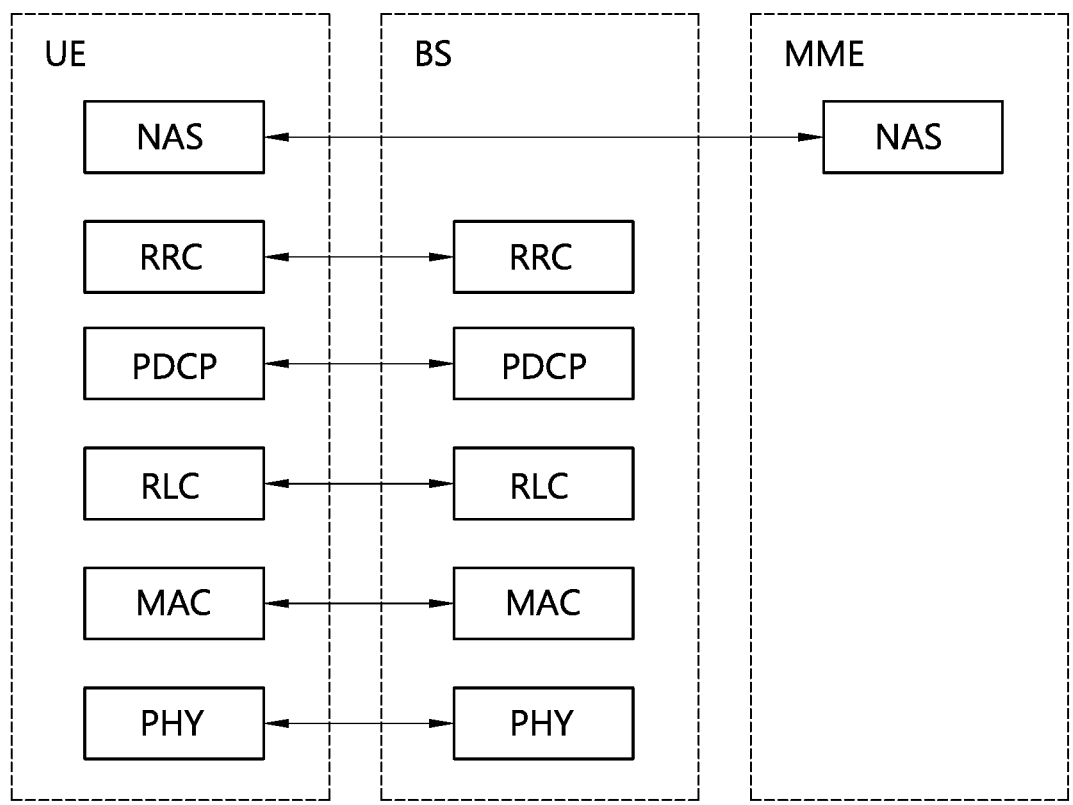
FIG. 3 is a diagram illustrating a radio protocol architecture for a control plane.

FIG. 2 is a diagram illustrating a radio protocol architecture for a user plane. FIG. 3 is a diagram illustrating a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs).

An RB is a logical path provided by the first layer (i.e., the PHY layer) and the second layer (i.e., the MAC layer, the RLC layer, and the PDCP layer) for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state, and otherwise the UE is in an RRC idle state.

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
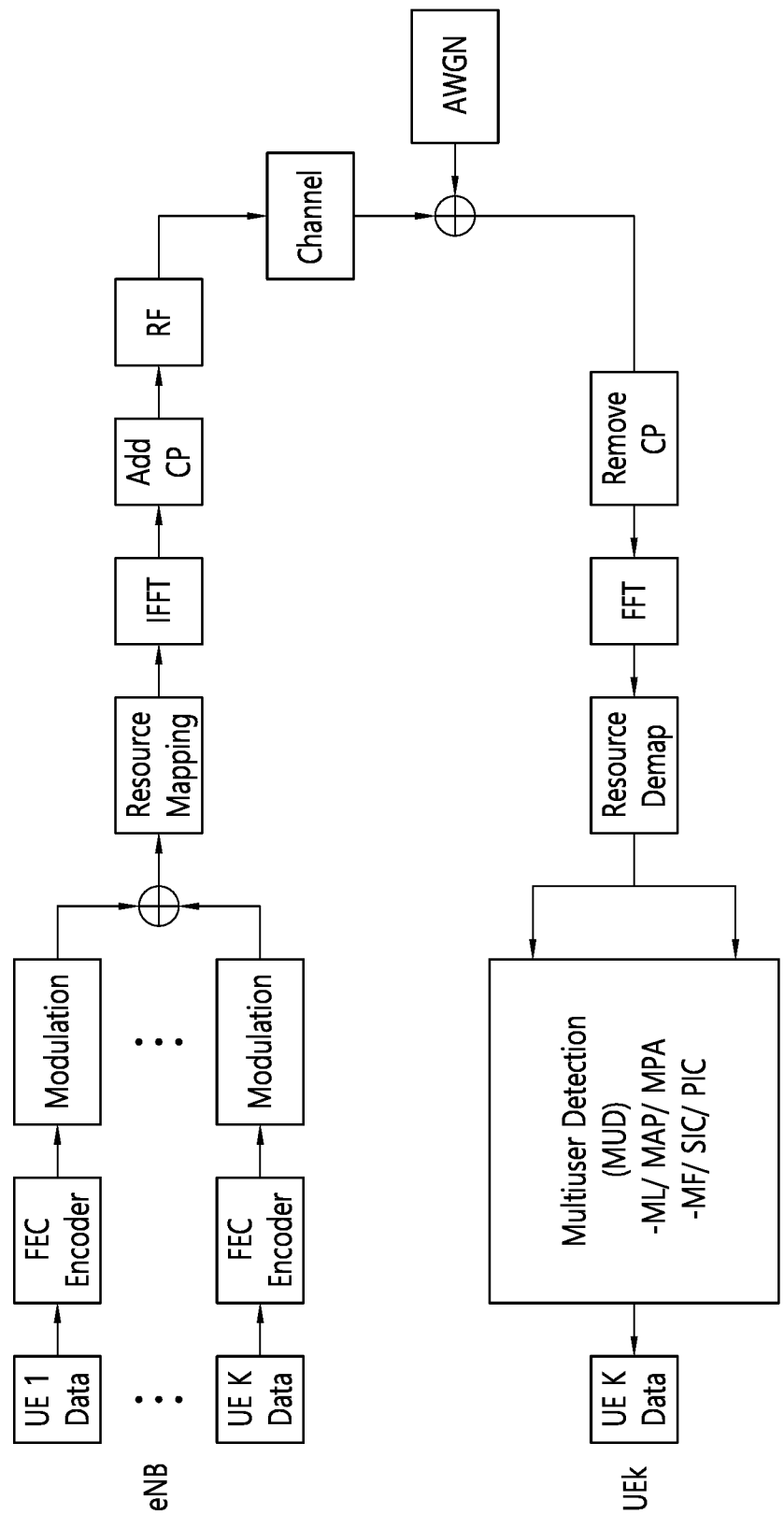
FIG. 4 is a block diagram illustrating NOMA based downlink transmission/reception (Tx/Rx) of a communication apparatus.

FIG. 4 is a block diagram illustrating NOMA based downlink transmission/reception (Tx/Rx) of a communication apparatus.

In a Non-orthogonal Coded Multiple Access (NCMA) scheme for transmitting multi-UE (or multi-user) information by allocating the multi-UE information to the same resource, a transmitter and receiver structure for downlink support as shown in FIG. 4 is general. The NOMA system may be referred to as Multiuser Superposition Transmission (MUST) in the 3GPP standardization task. The NOMA system is considered as the element technology of the next generation 5G system intended to obtain transmission capacity gain or increase the number of simultaneous accesses as compared with the LTE system by transmitting information for a plurality of UEs to the same time-frequency resource through superposition. Examples of the NOMA based technology of the next generation 5G system include MUST for identifying UEs based on a power level, Sparse Code Multiple Access (SCMA) that uses sparse complex codebook based modulation, and interleave division multiple access (IDMA) that uses a user-specific interleaver.

In case of the MUST system, the transmitter of FIG. 4 varies power allocation of each symbol after modulation of multi-UE data or transmits the multi-UE data by hierarchically modulating the multi-UE data based on hierarchical modulation, and the receiver demodulates the data of the multi-UE (hereinafter, referred to as multi-UE data) through multi-UE detection (or multiuser detection) (MUD).

In case of the SCMA system, the transmitter of FIG. 4 replaces a modulation procedure of a forward error correction (FEC) encoder and modulation procedure for multi-UE data with a sparse complex codebook modulation scheme which is previously scheduled, and the receiver demodulates the multi-UE data through MUD.

In case of the IDMA system, the transmitter of FIG. 4 modulates FEC encoding information for multi-UE data through a UE-specific interleaver, and the receiver demodulates the multi-UE data through MUD.

Each system may demodulate the multi-UE data in various MUD schemes. Examples of the various MUD schemes include Maximum Likelihood (ML), Maximum joint A posteriori Probability (MAP), Message Passing Algorithm (MPA), Matched Filtering (MF), Successive Interference Cancellation (SIC), Parallel Interference Cancellation (PIC), and Codeword Interference Cancellation (CWIC). There may be a difference in demodulation complexity and processing time delay in accordance with each demodulation scheme or each demodulation attempt.

Figure 5:
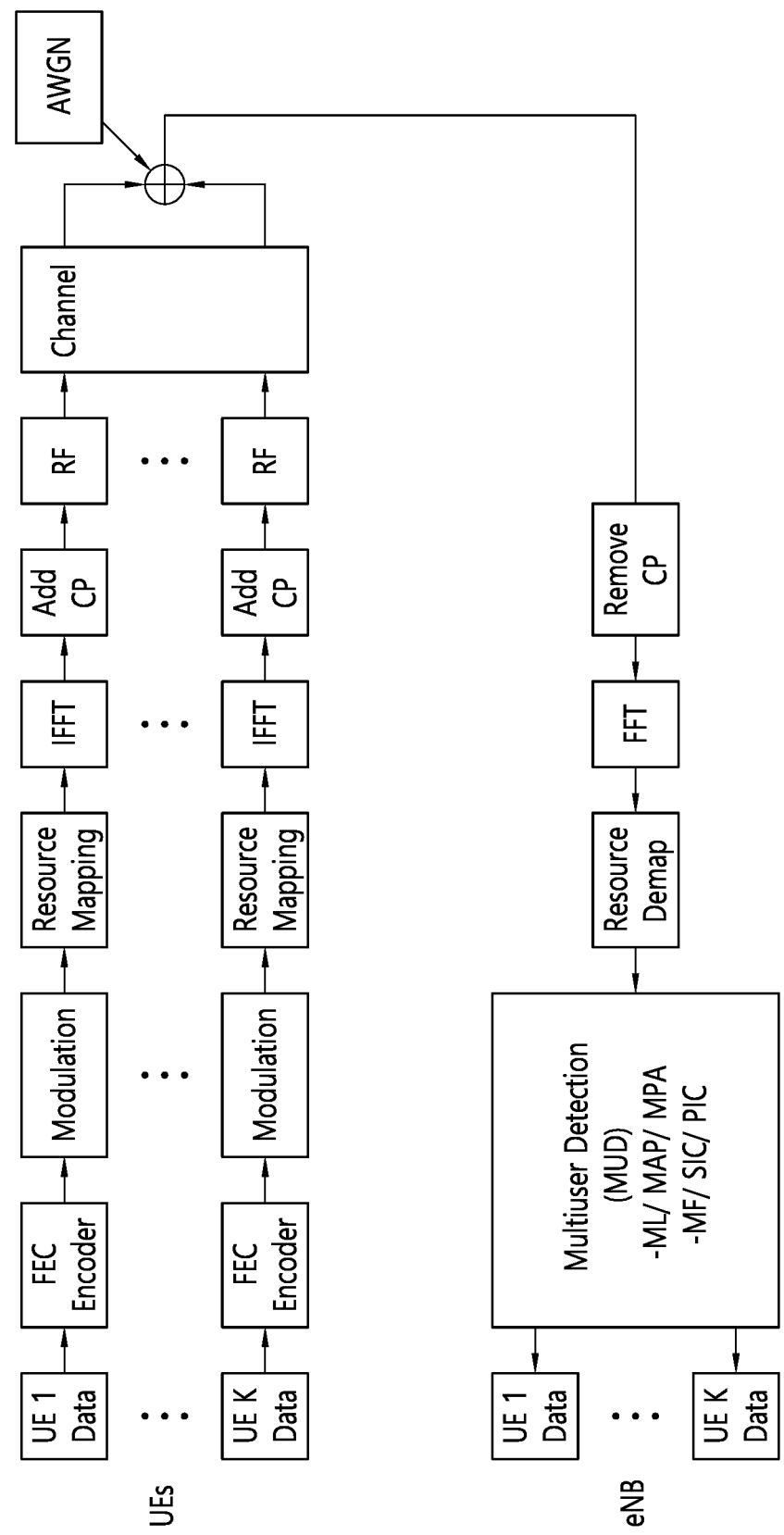
FIG. 5 is a block diagram illustrating NOMA based uplink transmission/reception (Tx/Rx) of a communication apparatus.

FIG. 5 is a block diagram illustrating NOMA based uplink transmission/reception (Tx/Rx) of a communication apparatus.

A transmitter and receiver structure for uplink support of the NOMA based system that transmits information of multi-UE (hereinafter, referred to as multi-UE information) by allocating the multi-UE information to the same resource is shown in FIG. 5. Each system may transmit multi-UE data in the same manner as the description of the downlink structure of FIG. 4 and modulate the multi-UE data through the receiver. Since the NOMA based systems transmit multi-UE signals to the same time-frequency resource through superposition, the systems have a higher decoding error rate as compared with the LTE system but may support higher frequency usage efficiency or more massive connectivity. The NOMA systems may achieve higher frequency usage efficiency or more massive connectivity while maintaining a decoding error through coding rate control in accordance with a system environment.

Since the NOMA based systems allocate data of multi-UEs to the same resource, interference of multi-UE data is necessarily generated as compared with allocation of single-UE data. A signal of the kth receiver in the NOMA based system of FIG. 4 is simply expressed as illustrated in the following Equation 1.

$$y_k = \sum_{n=1}^{K} h_k s_n + n_k = h_k s_k + \sum_{n \neq k, n=1}^{K} h_k s_n + n_k \quad \text{[Equation 1]}$$

In this case, $h_k$ means a channel from the transmitter to the kth receiver, $s_k$ means a data symbol to the kth receiver, and $n_k$ means signal noise. K is the number of multiple UEs allocated to the same time-frequency resource.

The second term $$\sum_{n \neq k, n=1}^{K} h_k s_n$$

of the third formula of the Equation 1 indicates multiuser interference (MUI) signal according to a data symbol to another receiver. Therefore, transmission capacity according to the received signal is simply expressed as illustrated in the following Equation 2.

$$C = \sum_{k=1}^{K} R_k \quad \text{[Equation 2]}$$

$$R_k = \log_2\left(1 + \frac{|h_k s_k|^2}{|\sum_{n \neq k, n=1}^{K} h_k s_n|^2 + \sigma_k}\right)$$
$$= \log_2\left(1 + \frac{\text{Channel Gain}}{MUI + \text{Noise}}\right), \forall k$$

In transmission capacity of the above Equation 2, the number of Rk added in accordance with increase of K may be increased, whereby increase of C may be expected. However, each Rk may be reduced due to increase of MUI in accordance with increase of K, entire transmission capacity C may be reduced. In accordance with the MUD scheme, even though data of each UE may be demodulated while MUI is being effectively reduced, the presence of MUI reduces entire transmission capacity and requires MUD of high complexity. If MUI occurrence of data transmission of the multi-UE is minimized, higher transmission capacity may be expected. Alternatively, if MUI occurrence for data transmission of the multi-UE may be controlled quantitatively, higher transmission capacity may be planned by scheduling of data superposition of the multi-UE. Therefore, the development of multi-UE access technology that may control MUI according to data superposition transmission of the multi-UE is required. The development of multi-UE access technology that may control MUI generated during data superposition transmission of the multi-UE to the same time-frequency resource is required.

Therefore, the present invention suggests a non-orthogonal coded multiple access (NCMA) that minimizes multi-UE interference of the next generation 5G system.

Figure 6:
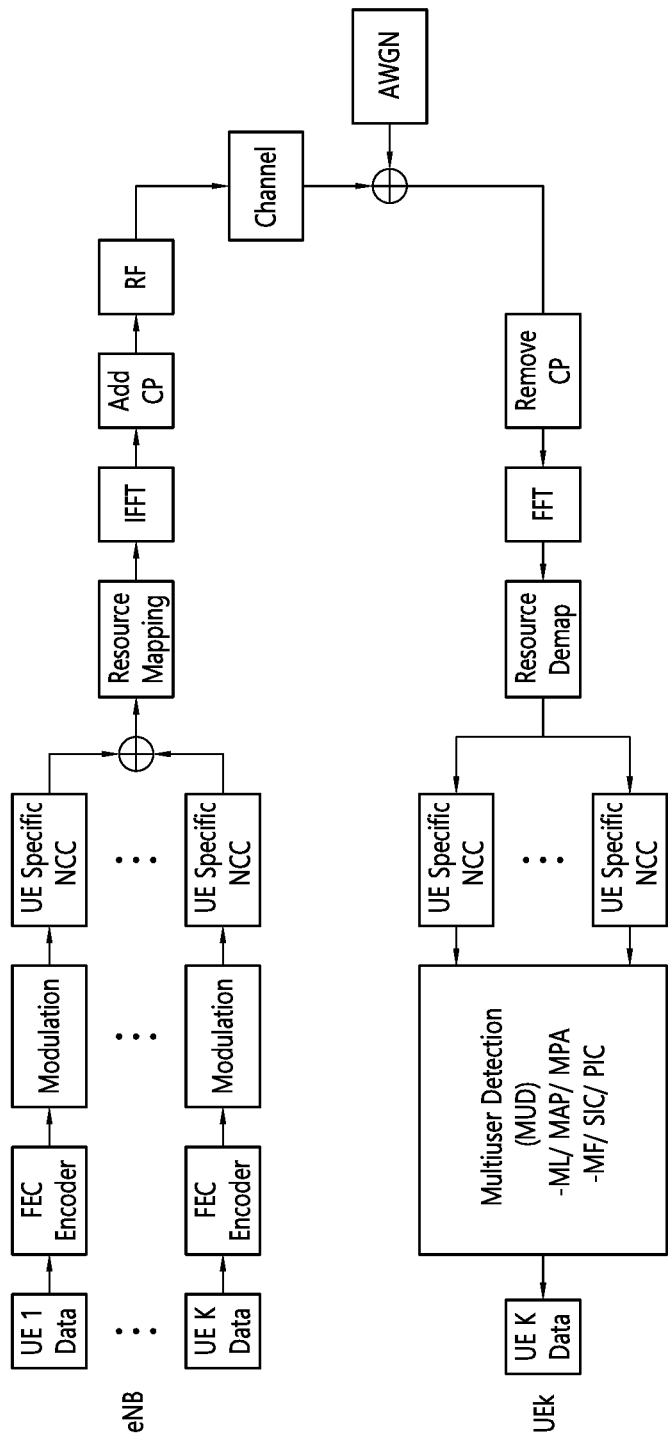
FIG. 6 is a block diagram illustrating NCMA based downlink transmission/reception (Tx/Rx) of a communication apparatus.
Figure 7:
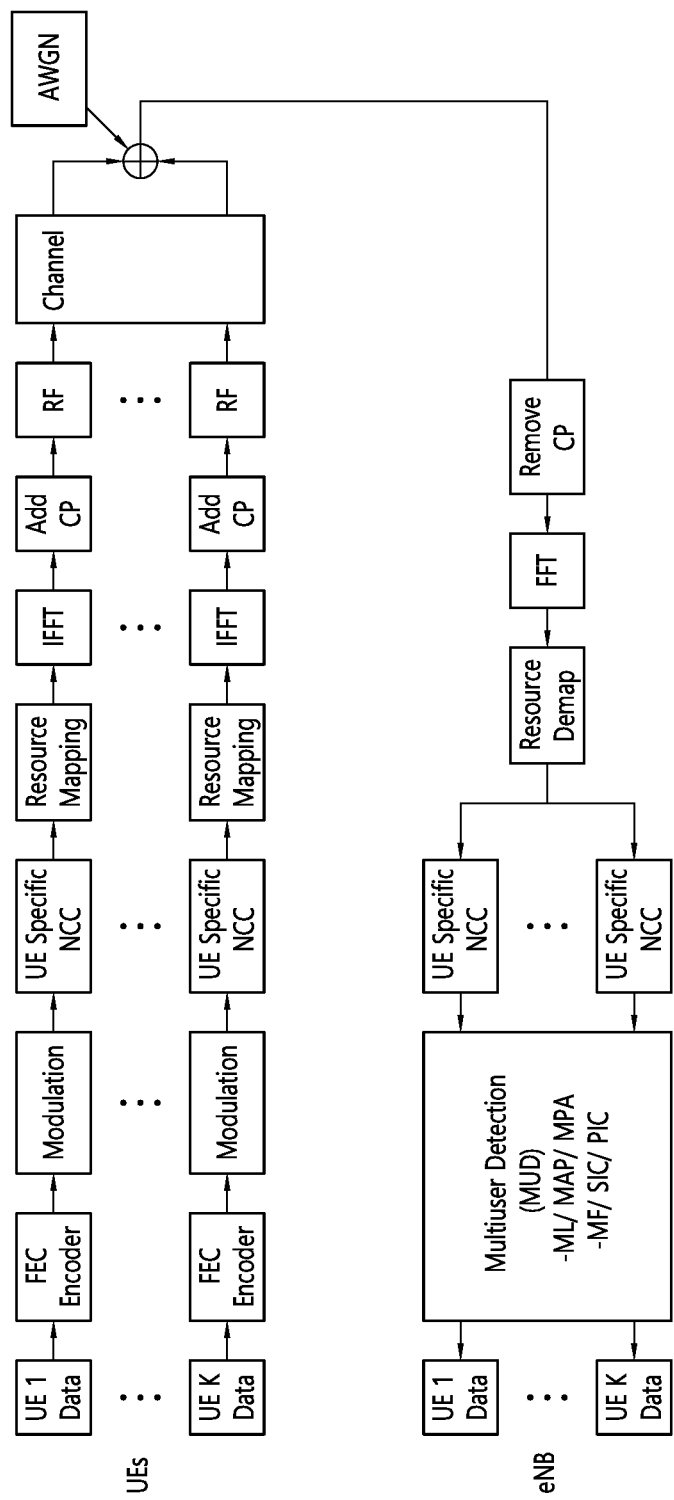
FIG. 7 is a block diagram illustrating NCMA based uplink transmission/reception (Tx/Rx) of a communication apparatus.

FIG. 6 is a block diagram illustrating NCMA based downlink transmission/reception (Tx/Rx) of a communication apparatus, and FIG. 7 is a block diagram illustrating NCMA based uplink transmission/reception (Tx/Rx) of a communication apparatus.

The present invention suggests an NCMA scheme that minimizes multi-UE interference when data of multi-UE are transmitted to the same time-frequency resource through superposition. FIGS. 6 and 7 illustrate downlink and uplink transmitter and receiver structures of the NCMA system that performs superposition transmission by using UE specific non-orthogonal code cover (NCC) when multi-UE information is allocated to the same time-frequency resource. The transmitter/receiver (or transmitting side/receiving side) allocates UE-specific NCC to each UE by using a non-orthogonal codebook which is previously defined.

The codeword mentioned in the present invention means a complex element vector selected by (or allocated to) each UE to perform non-orthogonal multiple access. The codebook means a set of codewords used by each UE to perform non-orthogonal multiple access. The codebook mentioned as above may exist as a plurality of codebooks. The UE-specific NCC means that the complex element vector of the codebook selected by (or allocated to) each UE is used for a symbol to be transmitted. Therefore, the NCC (or UE-specific NCC) may be expressed as codebook index and codeword index. The non-orthogonal codebook is expressed as illustrated in the following Equation 3.

$$C = [c^{(1)} \; \ldots \; c^{(K)}] = \begin{bmatrix} c_1^{(1)} & \ldots & c_1^{(K)} \\ \vdots & \ddots & \vdots \\ c_N^{(1)} & \ldots & c_N^{(K)} \end{bmatrix} \quad \text{[Equation 3]}$$

In the above Equation 3, $c^{(j)}$ is a codeword for the jth UE, and a codeword set for a total of K UEs becomes a codebook C. Use of $c^{(j)}$ for data transmission of the jth UE is defined as NCC. Also, the codebook may be expressed as a vector length N of the codeword and the number K of codewords. In this case, N means a spreading factor, and K means a superposition factor. For convenience of description, although one codeword is used for one UE, a plurality of codewords may be used by one UE or one codeword may be used by a plurality of UEs. Also, one or more codewords allocated to one UE may be subjected to hopping of codewords by use of different codewords in the same codebook or use of different codewords in different codebooks in accordance with time or usage frequency.

UE-specific NCC may be allocated by connection with UE ID in RRC connection process, or may be allocated through DCI (downlink control information) format included in a downlink control channel (for example, PDCCH).

In case of an uplink environment used for contention based multiple access (MA), a UE may select non-orthogonal codewords randomly or through connection with UE ID. At this time, UE-specific NCC is not allocated by a base station but directly selected by a UE, whereby NCC contention between multiple UEs may occur. A success rate for identification of multi-UE information is reduced due to MUD if there is contention of NCC in the base station which is a receiver.

The UE-specific NCC may be defined by Grassmannian line packing, and a chordal distance formed by two random vectors in the same subspace is always maintained equally. That is, the chordal distance may be obtained mathematically or algorithmically as a codebook that satisfies $$\min_C (\max_{1 \leq k < j \leq K} \sqrt{1 - |c^{(k)*} \cdot c^{(j)}|^2}), C \subset \mathbb{C}^{N \times K}.$$

The UE-specific NCC has features as expressed by the following Equation 4.

$$\begin{cases} |c^{(k)*} \cdot c^{(k)}| = 1, \forall k, k = 1, \ldots, K, \\ \text{if } N > K, |c^{(k)*} \cdot c^{(j)}| = \delta, \forall k, \forall j, k = 1, \ldots, K, j = 1, \ldots, K, \\ \text{if } N \leq K, |c^{(k)*} \cdot c^{(j)}| = 0, \forall k, \forall j, k = 1, \ldots, K, j = 1, \ldots, K. \end{cases} \quad \text{[Equation 4]}$$

In this case, $c^{(k)*}$ is a conjugate codeword of c(k). The features of the Equation 4 are as listed in the followings (1), (2), and (3).

(1) Multiplication of the same codewords in the transmitter and the receiver is 1.

(2) The chordal distance between a codeword and another codeword in the same codebook is equally maintained.

(3) If N≤K, a codeword is orthogonal to another codeword.

The codebook having the above features is previously scheduled by the transmitter/receiver (or transmitting side/receiving side) to configure UE-specific NCC. In this case, a lower bound of a chordal distance $$\delta_{N,K} \geq \sqrt{1 - \frac{(N-1)K}{N(K-1)}}$$

according to two random codewords is obtained. Therefore, MUI for superposition transmission of multi-UE data is determined by being minimized by the lower bound. Also, since the chordal distance for the two random codewords is always maintained equally, statistical prediction of MUI may be performed by the number of UEs. If the number of UEs is determined, since a decoding error rate of the receiver may be predicted by MUI value, MCS level may be controlled based on interference for multi-UE superimposition transmission. For example, when K codewords are transmitted in (N×1) dimension, if the receiver performs decoding using its codewords, 1 is decoded from its codeword, and statistical interference of $\delta_{N,K}(K-1)$ remains from another K−1 codewords. This value is varied depending on an optimization level of a codebook design. Also, since a difference in a value of $\delta_{N,K}$ exists depending on the optimization level of the codebook design, the number K of superposition UEs or the number N of used resources may be varied depending on Required SINR or target QoS of the communication system, whereby the MUI value may be controlled.

The embodiment of the non-orthogonal codebook is expressed in the form of 3GPP TS 36.211 as listed in that following Tables 1 and 2, and may be used as UE-specific NCC.

Table 1 illustrates a codebook in case of Spreading Factor N=2.

TABLE 1

| # of codewords (Max. # of users: K) | Examples of spreading codebook [$c^{(1)} \ldots c^{(K)}$] |
|---|---|
| 2 | $\begin{bmatrix} 1 & 1 \\ 1 & -1 \end{bmatrix}$ |
| 3 | $\begin{bmatrix} -0.5078 - 0.2451i & -0.8055 + 0.5684i & -0.1483 - 0.4194i \\ 0.5640 - 0.6034i & 0.1640 + 0.0357i & -0.8751 - 0.1904i \end{bmatrix}$ |
| 4 | $\begin{bmatrix} -0.4907 - 0.7256i & -0.6440 - 0.5906i & -0.1657 + 0.2160i & -0.5775 - 0.2480i \\ 0.4510 + 0.1709i & -0.4452 + 0.1956i & 0.9349 - 0.2279i & -0.3586 - 0.6902i \end{bmatrix}$ |

Table 2 illustrates a codebook in case of Spreading Factor N=4.

TABLE 2

| # of codewords (Max. # of users: K) | Examples of spreading codebook $[c^{(1)} \ldots c^{(K)}]$ |
|---|---|
| 4 | $\begin{bmatrix} 1 & 1 & 1 & 1 \\ 1 & 1 & 1 & 1 \\ 1 & 1 & -1 & -1 \\ 1 & -1 & -1 & 1 \end{bmatrix}$ |
| 6 | $\begin{bmatrix} -0.0557-0.4476i & -0.1684-0.8131i & -0.0149+0.2205i & \ldots \\ & -0.0198-0.1206i & -0.3294-0.3689i & -0.0487+0.4148i \\ 0.4023-0.1460i & -0.4021+0.2118i & -0.6703+0.0282i & \ldots \\ & -0.6521-0.4251i & -0.0729-0.0903i & -0.2158-0.3003i \\ -0.1499-0.3961i & 0.0471-0.2647i & 0.3131-0.5204i & \ldots \\ & -0.5576-0.0206i & 0.6726-0.0552i & 0.0357+0.0924i \\ 0.5675+0.3346i & -0.0866+0.1557i & -0.0287+0.3624i & \ldots \\ & -0.0286+0.2589i & 0.4567-0.2792i & 0.6985+0.4372i \end{bmatrix}$ |
| 8 | $\begin{bmatrix} -0.2381-0.8369i & -0.6599-0.1222i & -0.6557-0.1776i & -0.1561+0.0861i & \ldots \\ & -0.1374+0.1275i & -0.1849+0.3859i & -0.2426-0.2248i & -0.1703-0.0604i \\ -0.2593-0.3320i & 0.4906+0.0221i & 0.3934+0.2749i & -0.3453-0.2068i & \ldots \\ & -0.5596+0.0272i & 0.0616+0.0315i & -0.3027-0.3133i & -0.7664+0.1256i \\ -0.1249+0.0320i & 0.0425+0.3856i & 0.0440-0.3295i & -0.3979+0.0525i & \ldots \\ & -0.5272-0.2195i & 0.0649-0.8770i & -0.2452+0.4427i & -0.0149-0.4727i \\ -0.2180-0.0342i & 0.3968-0.0250i & -0.3444-0.2811i & -0.7817-0.1845i & \ldots \\ & 0.2417+0.5162i & 0.1956-0.0203i & 0.4625-0.4805i & 0.0794-0.3663i \end{bmatrix}$ |

Various values may be obtained using mathematical equation or algorithm in addition to the above Tables 1 and 2.

Figure 8:
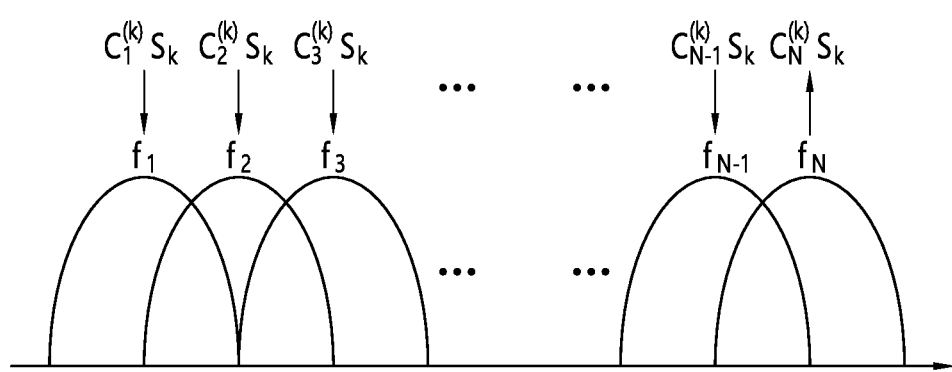
FIG. 8 is a conceptual diagram illustrating a frequency axis of data transmission according to UE-specific NCC.

FIG. 8 is a conceptual diagram illustrating a frequency axis of data transmission according to UE-specific NCC.

FIG. 8 illustrates a concept that a transmitter (or transmitting side) transmits kth UE data on a frequency axis through UE-specific NCC. When UE-specific NCC defined by Grassmaniann line packing is previously scheduled by the transmitter and the receiver, data for the kth UE is multiplied by a codeword corresponding to the kth UE. At this time, one data symbol $s_k$ corresponds to a codeword vector $c^{(k)}$ of (N×1) dimension. Then, N elements of the codeword correspond to N subcarriers.

That is, in FIG. 8, since one data symbol is transmitted to N subcarriers, the same time-frequency resource efficiency is reduced to 1/N as compared with the legacy LTE system. On the other hand, if N or more symbols are transmitted by superposition, time-frequency resource efficiency is increased as compared with the LTE system. For example, if K symbols are transmitted by superposition in case of N<K, frequency resource efficiency is increased as much as K/N times.

Figure 9:
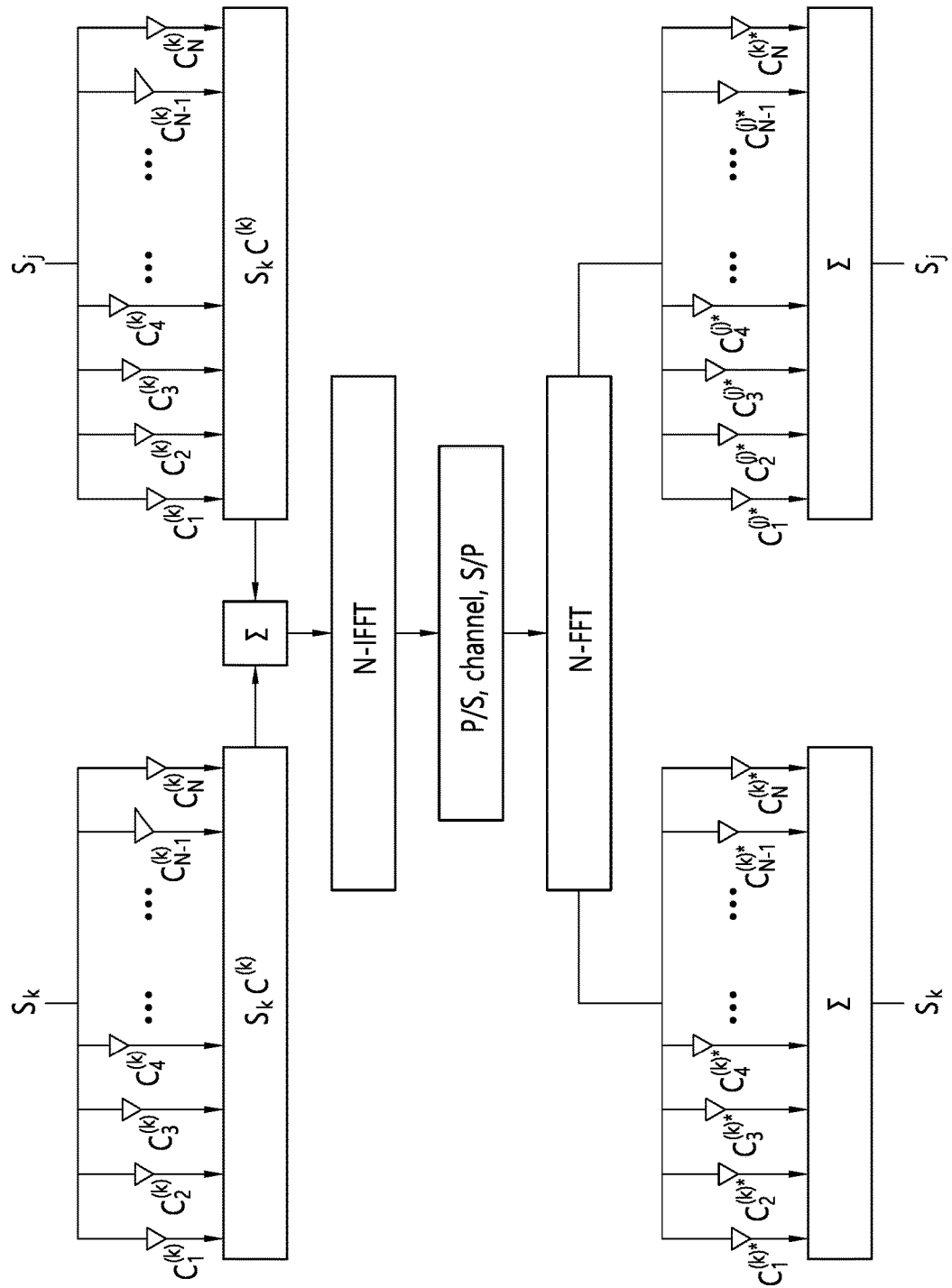
FIG. 9 is a structural diagram illustrating basic transmission and reception of NCMA system.

FIG. 9 is a structural diagram illustrating basic transmission and reception of NCMA system.

FIG. 9 is a basic transmission and reception structural view of NCMA system that uses UE-specific NCC. Data symbols for each UE are converted to UE-specific NCC corresponding to each UE and superposed in the transmitter. A frequency axis signal of a superposed N length is converted to a time-axis signal through N-IFFT, whereby OFDM transmission is performed, and the receiver restores the time-axis signal to a frequency-axis signal through N-FFT. The restored frequency-axis signal decodes each UE data symbol using a conjugate codeword of UE-specific NCC corresponding to each UE. The decoded $s_k$ may include MUI depending on the number of superposed UEs, and exact $s_k$ decoding is available through MUD. At this time, the length of the frequency-axis signal converted in accordance with UE-specific NCC which is previously defined may be shorter than N. For example, if two frequency-axis signal vectors converted to UE-specific NCC of N/2 length are connected in series to form N length, it will be apparent that demodulation is available in the receiver even in case of N-FFT.

In case of downlink, a detection equation for data decoding in the kth UE receiver is expressed as illustrated in the following Equation 5.

$$y_k = \sum_{n=1}^{K} H_k c^{(n)} s_n + n_k,$$ [Equation 5]

$$\hat{y}_k = \left[\frac{[y_k]_j}{[H_k]_{j,j}}\right]_{j=1,\ldots,N} = \sum_{n=1}^{K} c^{(n)} s_n + \hat{n}_k,$$

In the above Equation 5, $H_k$ means (N×N) channel matrix from the kth transmitter to the receiver, and includes frequency-axis channel coefficients as a diagonal matrix. $c^{(k)}$ is (N×1) UE-specific NCC vector for the receiver at the kth transmitter, $s_k$ is a data symbol to the kth receiver, and n means (N×1) signal noise vector. K is the number of multi-UEs allocated to the same time-frequency resource. In this case, $$\left[\frac{[A]_j}{[B]_{j,j}}\right]_{j=1,\ldots,N}$$

means division of the jth element of vector A and the jth diagonal element of matrix B. If the vector A is a diagonal matrix, the vector A means element division of diagonal matrixes.

A signal of desired codewords and noise remain through channel compensation in the above Equation 5, and are detected as expressed by the following Equation 6 through conjugate codeword of UE-specific NCC of the receiver.

$$\tilde{y}_k = c^{(k)*} \cdot \hat{y}_k \quad \text{[Equation 6]}$$
$$= c^{(k)*} \cdot c^{(k)} s_k + \sum_{n \neq k, n=1}^{K} c^{(k)*} \cdot c^{(n)} s_n + \tilde{n}_k,$$
$$= s_k + \sum_{n \neq k, n=1}^{K} c^{(k)*} \cdot c^{(n)} \cdot s_n + \tilde{n}_k.$$

In the above Equation 6, the second item of the last column indicates MUI, and may be removed or reduced through the MUD scheme.

In case of uplink, a detection equation for data decoding in the receiver of the base station is expressed as illustrated in the following Equation 7.

$$y = \sum_{n=1}^{K} H_n c^{(n)} s_n + n = H_k c^{(k)} s_k + \sum_{n \neq k, n=1}^{K} H_n c^{(n)} s_n + n, \quad \text{[Equation 7]}$$

The second term of the third formula of the Equation 7 indicates multi-UE interference signal MUI according to a data symbol to another receiver. A detection equation of the receiver for data decoding of the kth UE is expressed as illustrated in the following Equation 8.

$$\hat{y}_k = \quad \text{[Equation 8]}$$
$$\left[ \frac{[y]_j}{[H_k]_{j,j}} \right]_{j=1,\ldots,N} = c^{(k)} s_k + \sum_{n=1}^{K} \left[ \frac{[H_n]_{j,j}}{[H_k]_{j,j}} \right]_{j=1,\ldots,N} c^{(n)} s_n + \hat{n},$$

A signal of desired codewords, MUI, and noise remain through channel compensation for the kth UE data, and are detected as expressed by the following Equation 9 through conjugate codeword of UE-specific NCC of the receiver.

$$\tilde{y}_k = c^{(k)*} \cdot \hat{y}_k \quad \text{[Equation 9]}$$
$$= c^{(k)*} \cdot c^{(k)} s_k + \sum_{n \neq k, n=1}^{K} c^{(k)*} \cdot$$
$$\left[ \frac{[H_n]_{j,j}}{[H_k]_{j,j}} \right]_{j=1,\ldots,N} c^{(n)} s_n + \tilde{n},$$
$$= s_k + \sum_{n \neq k, n=1}^{K} c^{(k)*} \cdot \left[ \frac{[H_n]_{j,j}}{[H_k]_{j,j}} \right]_{j=1,\ldots,N} c^{(n)} \cdot s_n + \tilde{n}.$$

In the above Equation 9, the second item of the last column indicates MUI, and may be removed or reduced through the MUD scheme. At this time, frequency-axis channel change of $$\left[ \frac{[H_n]_{j,j}}{[H_k]_{j,j}} \right]_{j=1,\ldots,N}$$

causes a change of MUI value when MUD according to UE-specific NCC is performed due to a change of a channel environment from the multi-UE. For convenience of description, a single transmitting and receiving antennas is provided, it will be apparent that the same scheme is applied to even an environment where multiple antennas are used.

According to the description related to the aforementioned NCMA scheme, it is possible to achieve higher frequency usage efficiency or more massive connectivity in accordance with the number of superposed UEs while controlling MUI according to multi-UE data superposition transmission.

In addition, the present specification proposes a signaling procedure for the aforementioned NCMA. Specifically, the present specification proposes a signaling method and a codebook information exchanging scheme for performing the NCMA.

Figure 10:
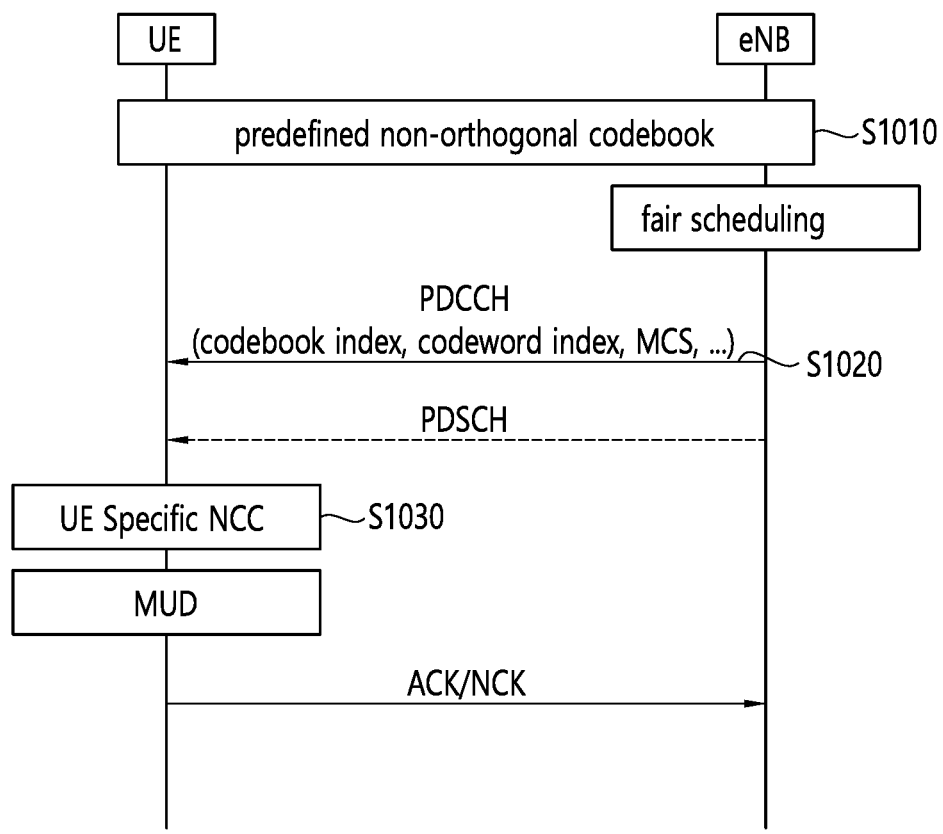
FIG. 10 is a flowchart showing a signaling procedure of a downlink NCMA system.
Figure 11:
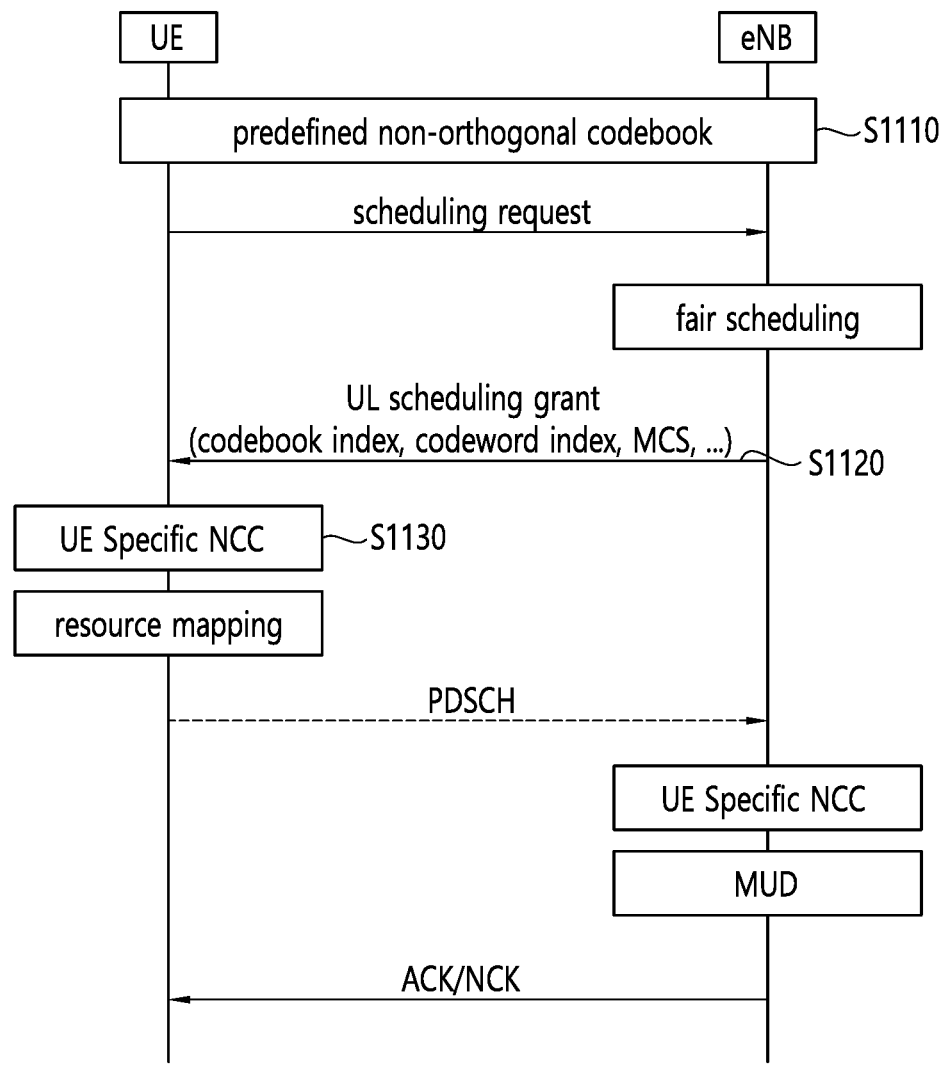
FIG. 11 is a flowchart showing a signaling procedure of an uplink NCMA system.

FIG. 10 is a flowchart showing a signaling procedure of a downlink NCMA system. FIG. 11 is a flowchart showing a signaling procedure of an uplink NCMA system.

Referring to FIG. 10 and FIG. 11, a user (or UE) and an eNB have pre-defined non-orthogonal codebook information (S1010, S1110). In this case, there may be various ways of having the pre-defined non-orthogonal codebook information.

For example, it is possible to have the non-orthogonal codebook information as shown in the following cases (1) and (2).

(1) When G(N, K) denotes an (N×K)-dimensional codebook defined by Grassmannian line packing, it is stored for each of N and K.

(2) It has a basis vector of an (N×1)-dimensional codeword constituting G(N, K).

Index information on the basis vectors or the non-orthogonal codebooks defined in the aforementioned method is defined as a codebook index. Upon generation of a DL or UL information transmission request, a codebook index corresponding to a UE specific NCC to be used by each user and a codebook index inside a corresponding codebook are transmitted to the user as control information through fairness scheduling of the eNB (S1020, S1120). That is, the NCC (codebook index, codeword index) for each user is transmitted according to a scheduling scheme. The user uses the UE specific NCC in modulation or demodulation through the received codebook index and codeword index (S1030, S1130). In this case, if a scheme for a pre-defined codebook corresponds to the case (1) above, the stored codebook is directly used. If the scheme for the pre-defined codebook corresponds to the case (2) above, the eNB and the user generate and use G(N, K) on the basis of the stored basis vector. In this case, the number of codewords allocated to each user may be 1, or may be at least 2. That is, in case of a user requiring a high data rate, two or more symbols are simultaneously transmitted through two or more codewords, and thus it is apparent that two or more symbols can be demodulated in a receiving side. In addition, N and K which determine a codebook dimension are changeable according to a system environment. If K is equal to or less than N, a codebook G(N, N) is used. The codebook G(N, N) is an orthonormal codebook.

According to the determined G(N, K), a chordal distance between the codewords may be defined as described above, and may be defined as MUI. The eNB is capable of resource management based on the MUI value in fairness scheduling, and determines an MCS level through a demodulation error rate based on the MUI value. The fairness scheduling may be performed based on the determined MCS level.

Although the present specification has been described based on downlink and uplink of a cellular system, apparently, it is also applicable to all systems using a multiple user access scheme such as Machine Type Communication (MTC), Device-to-Device (D2D), Vehicle-to-Everything (V2X), or the like.

However, a codebook exemplified in the conventional NCMA scheme is expressed by a coefficient of a complex form as a codeword for solving a Grassmannian line packing problem. Herein, the complex form implies that the number of digital bits required to express the coefficient corresponding to the codeword is great. Therefore, a great amount of bits are required to deliver or store the codeword. In addition, this has effect on computation complexity. Accordingly, there is a need for a quantization scheme for expressing a coefficient with a small number of bits while maintaining a characteristic of a Grassmannian sequence.

In the present specification, a non-orthogonal codeword used in NCMA is defined as a Grassmannian sequence. In order to quantize each coefficient while maintaining a characteristic (a sequence set which maximizes a minimum chordal distance, a sequence set of which cross-correlation between sequences is equally maintained, a non-constant-modulus sequence set) of the Grassmannian sequence, there is a need to normalize power and phase for each coefficient. The present specification proposes a scheme of quantizing each coefficient on the basis of QAM constellation. For example, one constellation is selected which has a minimum Euclidean distance between each coefficient of the Grassmannian sequence and M-QAM constellations in an In-phase quadrature-phase (IQ) domain. 16QAM is taken for example as shown in FIG. 12.

Figure 12:
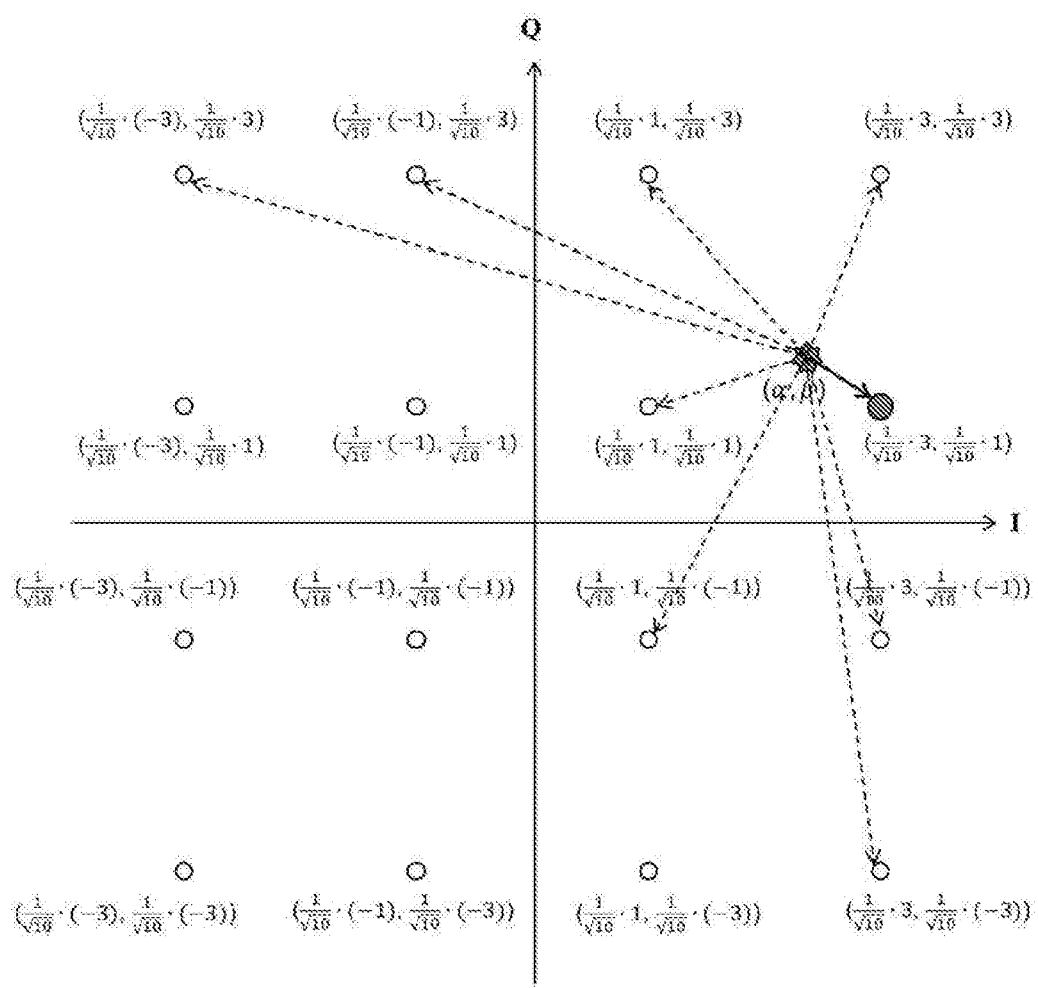
FIG. 12 shows an example of quantizing a Grassmannian sequence on the basis of QAM constellation according to the present embodiment.

FIG. 12 shows an example of quantizing a Grassmannian sequence on the basis of QAM constellation according to the present embodiment.

Referring to FIG. 12, it is assumed in the above figure that one coefficient of the Grassmannian sequence is ($\alpha$, $\beta$) in an IQ domain. Then, compared with 16QAM constellation, a coefficient is quantized as ($1/\sqrt{10}*3$, $1/\sqrt{10}*1$) having the smallest distance. Each coefficient is quantized in this manner. Herein, a mean value of a magnitude of all coefficients of the Grassmannian sequence and a mean value of a magnitude of M-QAM constellation are quantized in the same level. For example, when the magnitude of the coefficients of the Grassmannian sequence has a mean value of A, and the magnitude of the M-QAM constellations has a mean value of B, a set of the Grassmannian sequences is scaled with B. In addition, quantization is performed in a state where the value A is pre-stored, and normalization is performed such that the magnitude returns to A. This process is equivalent to a scheme in which quantization is performed after scaling with the mean value A for the coefficient of the Grassmannian sequence by scaling the magnitude of the M-QAM constellation.

That is, a mean value of M-QAM is B when mean(abs($c\_ij$))=A for i=1, ..., N and j=K for all coefficients in a codebook C. Thus, C*B/A=C', and each coefficient of C' is quantized with QAM constellation. In this case, the codebook C and the values A, B, C' may be expressed by the following equation.

$$C = \begin{bmatrix} '-0.332+0.5287i' & '-0.4097+0.8563i' & '-0.1019-0.3184i' & '-0.7084-0.3089i' \\ '0.2967+0.7227i' & '-0.3059+0.07222i' & '0.9012-0.2757i' & '0.4757+0.42i' \end{bmatrix}$$ [Equation 10]

$$A = \text{mean}(\text{abs}(c\_ij)) = 0.6692$$

$$B = \sqrt{10} \text{ (herein, } 16QAM \text{ is assumed, } M = 16\text{)}$$

$$C' = C*\sqrt{10}/0.6692 = \begin{bmatrix} -1.5687+2.4984i & -1.9362+4.0466i & -0.4815-1.5046i & -3.3477-1.4597i \\ 1.1018+3.4150i & -1.4455+0.3413i & 4.2588-1.3027i & 2.2478+1.9849i \end{bmatrix}$$

Each of the coefficients is quantized with QAM constellation as $$\begin{bmatrix} -1+3i' & '-1+3i' & '-1-1i' & '-3-1i' \\ '1+3i' & '-1+1i' & '3-1i' & '3+1i' \end{bmatrix}. \qquad 5$$

Even if the entire matrix is normalized with A in the quantized codebook, or is normalized with a magnitude sqrt(10) of 16QAM modulation, or is normalized with Tx Power, there is no change in a correlation characteristic of a matrix.

The following embodiment is for a case where all coefficients are quantized in the aforementioned manner.

Embodiment. example of M-QAM quantized Grassmannian Sequence

Codebook for Spreading Factor: N=2, K=4 (Table 3)

TABLE 3

| Quantization Level | Examples of spreading codebook $[c^{(1)} \ldots c^{(K)}]$ |
|---|---|
| Un-quantized | $\begin{bmatrix} '-0.332+0.5287i' & '-0.4097+08563i' & '-0.1019-0.3184i' & '-0.7084-0.3089i' \\ '0.2967+0.7227i' & '-0.3059+0.07222i' & '0.9012-0.2757i' & '0.4757+0.42i' \end{bmatrix}$ |
| 16QAM-quantized | $\dfrac{1}{\sqrt{10}} \cdot \begin{bmatrix} -1+3i' & '-1+3i' & '-1-1i' & '-3-1i' \\ '1+3i' & '-1+1i' & '3-1i' & '3+1i' \end{bmatrix}$ |
| 64QAM-quantized | $\dfrac{1}{\sqrt{42}} \cdot \begin{bmatrix} '-3+5i' & '-3+7i' & '-1-3i' & '-7-3i' \\ '3+7i' & '-3+1i' & '7-3i' & '5+3i' \end{bmatrix}$ |

Codebook for Spreading Factor: N=4, K=8 (Table 4)

TABLE 4

| Quantization Level | Examples of spreading codebook $[c^{(1)} \ldots c^{(K)}]$ |
|---|---|
| Un-quantized | $\begin{bmatrix} '-0.3769-0.1993i' & '-0.4946+0.07291i' & '-0.03488-0.1744i' & '-0.4983-0.2361i' & '-0.05891-0.2775i' & '-0.3141-0.2162i' & '-0.3118-0.2513i' & '-0.6128+0.4861i' \\ '0.007121-0.4246i' & '0.0484+0.2172i' & '-0.4864+0.51181i' & '0.3678-0.0001965i' & '0.6654-0.2483i' & '0.2752+0.08687i' & '-0.01466+0.3864i' & '-0.3671+0.3724i' \\ '-0.7438-0.2074i' & '0.1526-0.5642i' & '-0.1478+0.1545i' & '0.6445+0.1123i' & '-0.4067+0.4932i' & '-0.2122-0.4038i' & '-0.3986+0.2848i' & '-0.1428-0.06319i' \\ '0.06617-0.1932i' & '0.1281-0.5852i' & '-0.3512+0.5484i' & '-0.1883+0.3118i' & '0.07196+0.03621i' & '-0.5858+0.4691i' & '0.5659-0.3604i' & '0.282+0.104i' \end{bmatrix}$ |
| 16QAM-quantized | $\dfrac{1}{\sqrt{10}} \cdot \begin{bmatrix} '-3-1i' & '-3+1i' & '-1-1i' & '-3-1i' & '-1-1i' & '-1-1i' & '-1-1i' & '-3+3i' \\ '1-3i' & '1+1i' & '-3+3i' & '3-1i' & '3-1i' & '1+1i' & '-1+3i' & '-3+3i' \\ '-3-1i' & '1-3i' & '-1+1i' & '3+1i' & '-3+3i' & '-1-3i' & '-3+1i' & '-1+1i' \\ '1-1i' & '1-3i' & '-3+3i' & '-1+1i' & '1+1i' & '-3+3i' & '3-3i' & '1+1i' \end{bmatrix}$ |
| 64QAM-quantized | $\dfrac{1}{\sqrt{42}} \cdot \begin{bmatrix} '-5-3i' & '-7+1i' & '-1-3i' & '-7-3i' & '-1-3i' & '-5-3i' & '-5-3i' & '-7+7i' \\ '1-5i' & '1+3i' & '-7+7i' & '5-1i' & '7-3i' & '3+1i' & '-1+5i' & '-5+5i' \\ '-7-3i' & '1-7i' & '-1+3i' & '7+1i' & '-5+7i' & '-3-5i' & '-5+3i' & '-1+1i' \\ '1-3i' & '1-7i' & '-5+7i' & '-3+5i' & '1+1i' & '-7+7i' & '7-5i' & '3+1i' \end{bmatrix}$ |

In the aforementioned embodiment, elements of a matrix imply respective coefficients of an M-QAM quantized Grassmannian sequence. An un-quantized coefficient exemplified in the aforementioned scheme may be obtained mathematically or algorithmically in addition to the exemplified value, and there may be a difference in a value thereof.

In addition, since each coefficient is independently quantized, the M-QAM quantized Grassmannian sequence may not have unit power after quantization. Accordingly, each M-QAM quantized Grassmannian sequence is normalized with the unit power.

Although it has been described in the aforementioned scheme that quantization is achieved based on M-QAM, quantization for phase may be performed based on M-PSK, and quantization on power may be performed based on linear or non-linear scaling.

Quantization through the aforementioned scheme has a trade-off relation between the number of expression bits depending on a quantization level and a degree of supporting a Grassmannian characteristic without errors. For example, when quantized based on 16QAM, each constellation may be expressed by 2-bit information, but a Grassmannian sequence characteristic may be lost since an unquantized Grassmannian sequence and a 16QAM-quantized Grassmannian sequence have a great quantization error. On the other hand, when quantized based on 256QAM, each constellation may be expressed by 8-bit information, but the Grassmannian sequence characteristic may be maintained intactly since an unquantized Grassmannian sequence and a 256QAM-quantized Grassmannian sequence have a small quantization error.

An NCMA service is possible through a sequence subjected to quantization in the aforementioned manner, and a spreading code may be scaled by transmit power.

Although the Grassmannian sequence proposed in the aforementioned scheme has been described as a codeword used in NCMA, it may be used in a region capable of utilizing a sequence such as a sequence for a reference signal capable of utilizing a low correlation characteristic or a sequence for minimizing inter-cell interference.

The Grassmannian sequence obtained in the aforementioned scheme may maintain a Grassmannian characteristic even if all sequence sets are subjected to phase rotation in a vector space through vector wise phase rotation. Therefore, a quantized Grassmannian sequence may also be used in such a manner that all sequence sets are subjected to phase rotation in a vector space through a vector wise phase rotation. The Grassmannian sequence set may be generated plural in number through the aforementioned scheme. The sequence set generated in this manner may be used to control inter-cell interference.

In addition, in a state where the Grassmannian sequence is generated as G(4, 18), 3 cells may perform a NoMA service by selecting only 6 sequences from G(4, 18). Accordingly, cross-correlation in a single cell may be more increased than G(4,6). However, since cross-correlation between sequences used between cells can be maintained, inter-cell interference can be decreased. For example, it is assumed that there are 18 sequences S1, . . . , S18 through a sequence set of G(4,18). A cell 1 may use S1, . . . , S6, a cell 2 may use S7, . . . , S12, and a cell 3 may use S13, . . . , S18. Herein, the order may be selected differently according to an environment. In this case, inter-cell interference is determined by cross-correlation based on G(4,18), and thus the inter-cell interference can be reliably controlled while interference of a sequence between cells is configured to be low.

In addition, an example of a 64QAM quantized Grassmannian sequence based on a spreading codebook for minimizing MUI is as follows.

In case of a spreading factor N=2, an example of a 64QAM quantized Grassmannian sequence based on a codebook is as shown in the following table.

TABLE 5

| # of codewords (Max. # of users: K) | Examples of spreading codebook $[c^{(1)} \ldots c^{(K)}]$ |
|---|---|
| 2 | $\begin{bmatrix} 5+5i & 5+5i \\ 5+5i & -5-5i \end{bmatrix} * P_{no,2,2}$ |
| 4 | $\begin{bmatrix} -3+5i & -3+7i & -1-3i & -7-3i \\ 7-3i & -3+1i & 7-3i & 5+3i \end{bmatrix} * P_{no,2,4}$ |
| 6 | $\begin{bmatrix} -3+1i & -7-3i & -1-5i & -5+3i & -1-7i & -7+1i \\ 7-3i & -5+3i & -1-7i & -5-5i & -1-1i & 3-3i \end{bmatrix} * P_{no,2,6}$ |
| 8 | $\begin{bmatrix} -3-7i & -7-1i & -3-1i & -1-5i & -3-1i & -7+1i & -3-7i & 1+5i \\ -1-3i & 1-5i & -1+7i & -5-7i & 1-7i & 3+1i & -5+1i & -1-7i \end{bmatrix} * P_{no,2,8}$ |

In case of a spreading factor N=4, an example of a 64QAM quantized Grassmannian based on a codebook is as shown in the following table.

TABLE 6

| # of codewords (Max. # of users: K) | Examples of spreading codebook [$c^{(1)} \ldots c^{(K)}$] |
|---|---|
| 4 | $\begin{bmatrix} 5+5i & 5+5i & 5+5i & 5+5i \\ 5+5i & -5-5i & 5+5i & -5-5i \\ 5+5i & 5+5i & -5-5i & -5-5i \\ 5+5i & -5-5i & -5-5i & 5+5i \end{bmatrix} * P_{no,4,4}$ |
| 6 | $\begin{bmatrix} -7+3i & -3+1i & -1-7i & -1+1i & -7+5i & -3+1i \\ -5+1i & -1-5i & -3+1i & 3+5i & -3-7i & 5+7i \\ 3+1i & -1-7i & -1-3i & -1+7i & 3+3i & 5-7i \\ 1-7i & -7+3i & -3+1i & -5+5i & -1+3i & 1+3i \end{bmatrix} * P_{no,4,6}$ |
| 8 | $\begin{bmatrix} -5-3i & -7+1i & -1-3i & -7-3i & -1-3i & -5-3i & -5-3i & -7+7i \\ 1-5i & 1+3i & -7+7i & 5-1i & 7-3i & 3+1i & -1+5i & -5+5i \\ -7-3i & 1-7i & -1+3i & 7+1i & -5+7i & -3-5i & -5+3i & -1-1i \\ 1-3i & 1-7i & -5+7i & -3+5i & 1+1i & -7+7i & 7-5i & 3+1i \end{bmatrix} * P_{no,4,8}$ |

In Table 5 and Table 6 above, $P_{no,N,K}$ is a normalized matrix (N×K) for power constraints. $P_{no,N,K}$ is as follows.

$$P_{no,N,K} = \begin{bmatrix} P_{no,1} & 0 & 0 & 0 \\ 0 & P_{no,2} & 0 & 0 \\ 0 & 0 & \ddots & 0 \\ 0 & 0 & 0 & P_{no,K} \end{bmatrix} \quad \text{[Equation 11]}$$

Herein, $P_{no,k}=(1/|c^{(k)}|)\times\sqrt{N}$, for k=1, ..., K.

Figure 13:
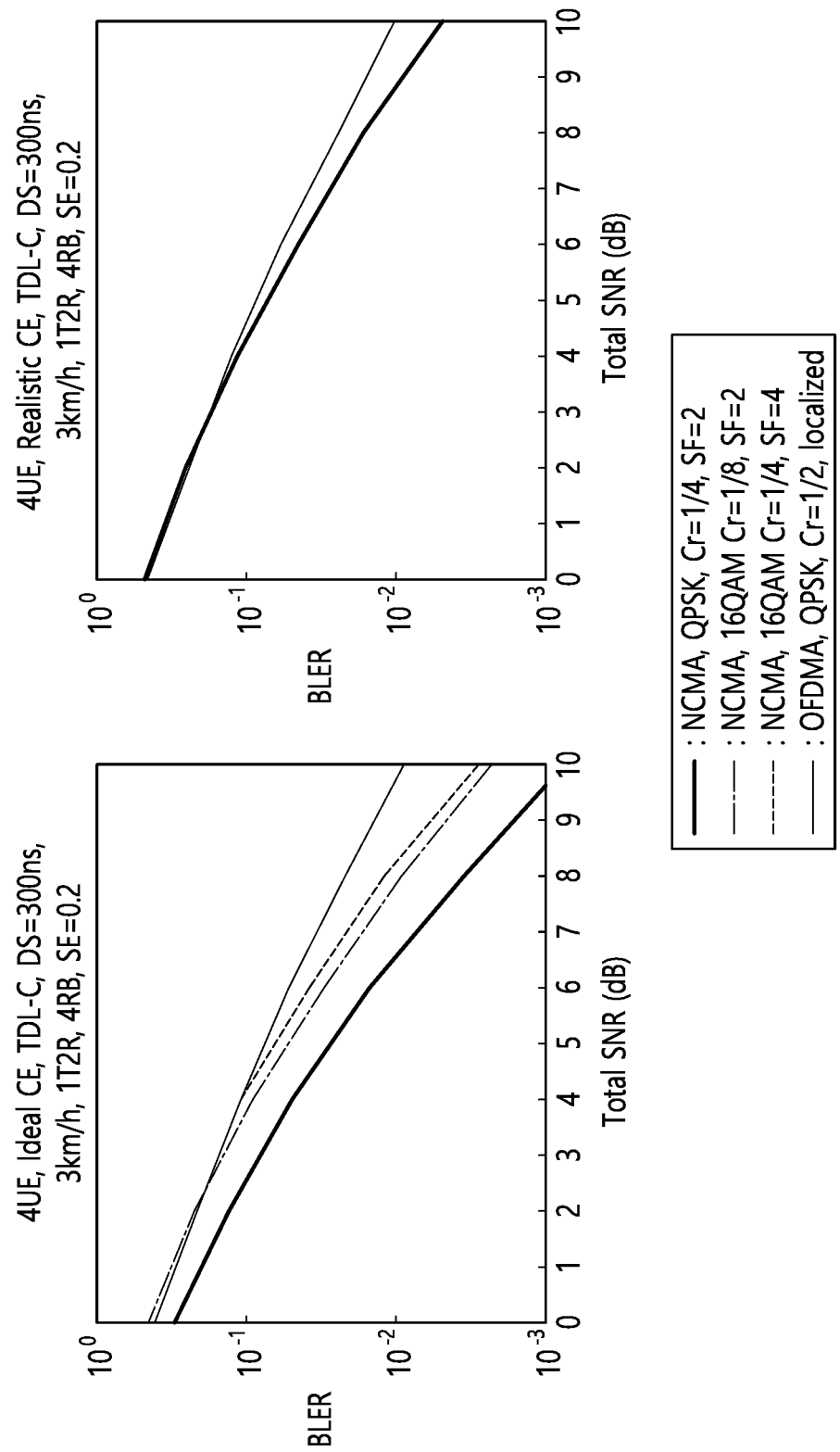
FIG. 13 shows BLER performance based on a proposed codebook according to the present embodiment.
Figure 14:
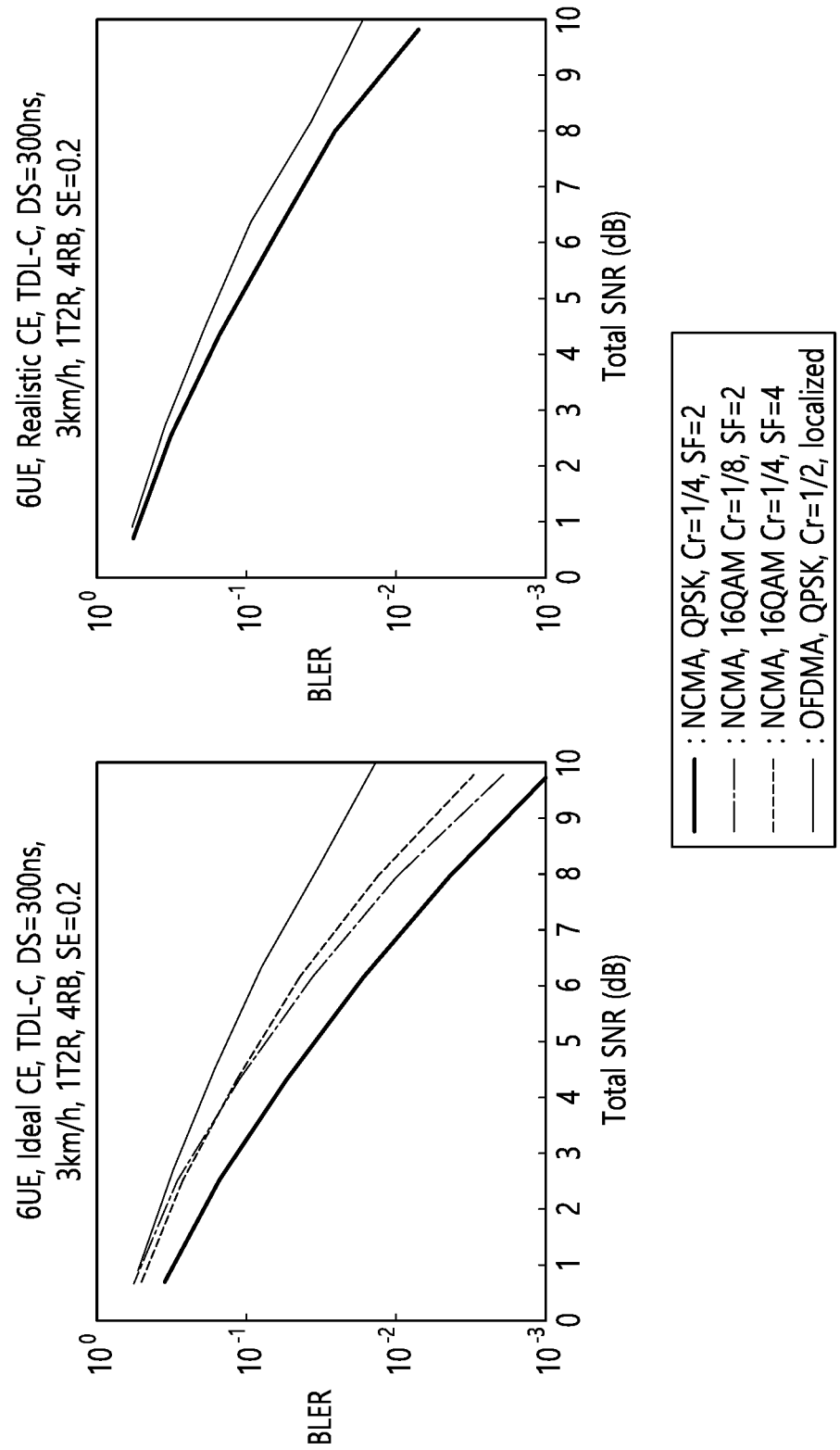
FIG. 14 shows BLER performance based on a proposed codebook according to the present embodiment.
Figure 15:
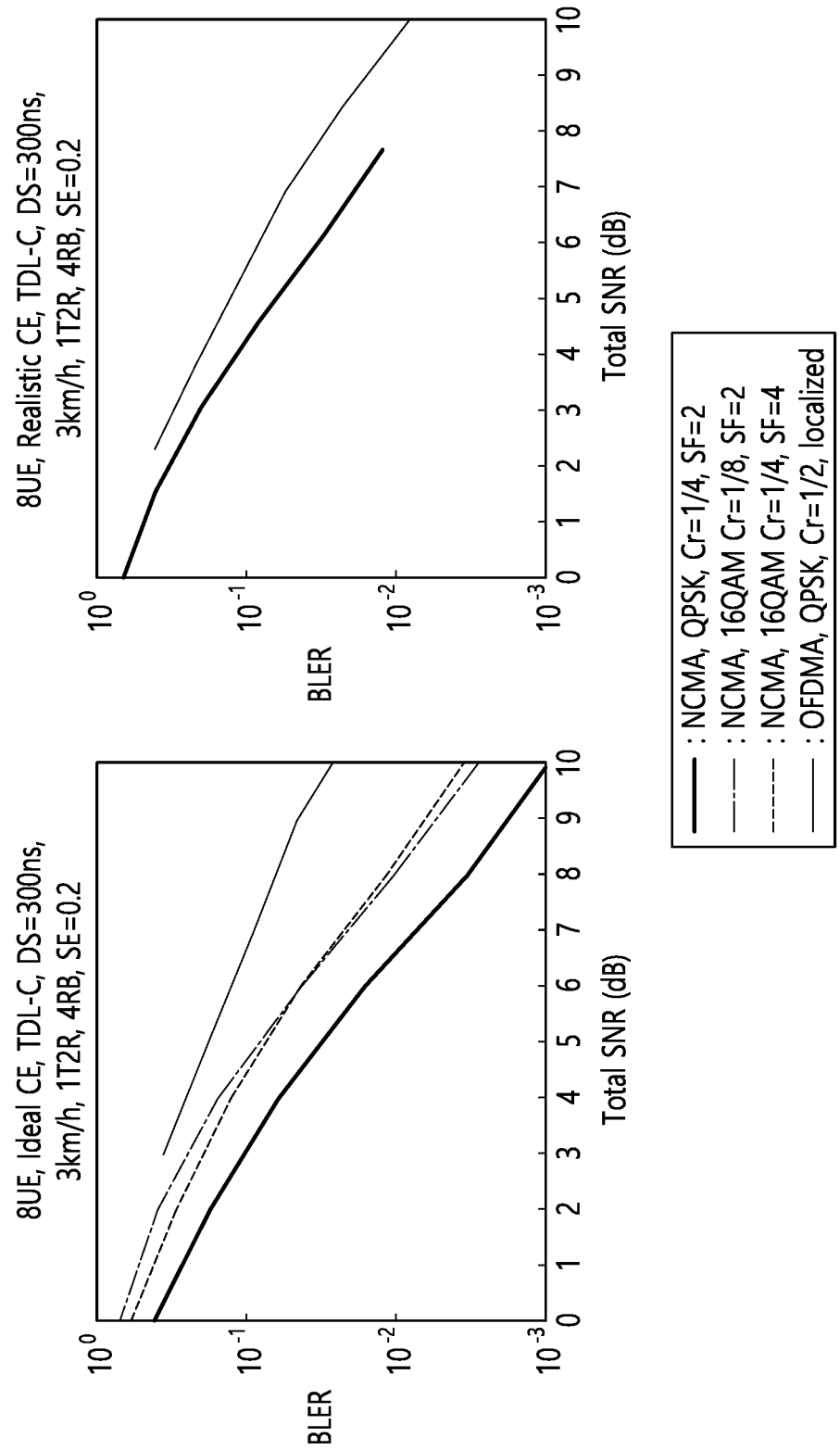
FIG. 15 shows BLER performance based on a proposed codebook according to the present embodiment.

Block error rate (BLER) performance based on the proposed codebook is as shown in FIG. 13 to FIG. 15. FIG. 13 to FIG. 15 show BLER performance based on the proposed codebook according to the present embodiment (BLER comparisons for SE per UE=0.2 [bps/Hz]). Specifically, FIG. 13 to FIG. 15 are graphs showing link level simulation results of NCMA through a 64QAM quantized Grassmannian sequence, compared with a reference OFDMA scheme in terms of BLER.

A result of FIG. 13 is measured in an NCMA system in which 4 UEs are present. A left drawing of FIG. 13 shows a link level simulation result obtained through ideal channel estimation, and a right drawing of FIG. 13 shows a link level simulation result obtained through realistic channel estimation.

A result of FIG. 14 is measured in an NCMA system in which 6 UEs are present. A left drawing of FIG. 14 shows a link level simulation result obtained through ideal channel estimation, and a right drawing of FIG. 14 shows a link level simulation result obtained through realistic channel estimation.

A result of FIG. 15 is measured in an NCMA system in which 8 UEs are present. A left drawing of FIG. 15 shows a link level simulation result obtained through ideal channel estimation, and a right drawing of FIG. 15 shows a link level simulation result obtained through realistic channel estimation.

According to the result based on FIG. 13 to FIG. 15, a gain of BLER performance can be more expected in the proposed quantized-NCMA (Q-NCMA) than the legacy OFDMA.

Hereinafter, a cumulative distribution function (DCF) based on cross-correlation of a non-orthogonal spreading sequence is compared to compare a performance result to which a quantized scheme is applied.

First, a type of a non-orthogonal spreading sequence is described. Since the NOMA scheme determines system performance by effectively decreasing MUI, a spreading sequence design is very important. 5 non-orthogonal sequences, that is, a Gaussian random sequence, a QPSK random sequence, a 9QAM random sequence, a Grassmannian sequence, and an M-QAM quantized Grassmannian sequence, may be discussed as the non-orthogonal sequence.

Herein, cross-correlation between randomly selected two sequences in a sequence set is analyzed to discuss characteristics of non-orthogonal sequences. The number of sequences in a sequence set is defined as 'L' and the sequence set is defined as 'S'. Then, the number of non-orthogonal spreading sequences in the sequence set is different according to a way of generating the sequences as follows:

The number of sequences in the sequence set (for given N)
Gaussian Random Sequence: infinite
QPSK Random Sequence: 4^N
9-QAM Random Sequence: 9^N−1
Grassmannian Sequence: K
M-QAM quantized Grassmannian Sequence: K Therefore, a set of sequences S consists of $\mathbb{C}^{N\times L}$, and two sequences in the set are randomly selected to calculate the cross-correlation. Then, the cross-correlation between the two sequences may be defined as follows.

$$I(i,j)=\mathrm{corr}(s^{(i)},s^{(j)})=|s^{(i)*}\cdot s^{(j)}|, s^{(i)}, s^{(j)} \in S, i\neq j, 1\leq i,j \leq L. \quad \text{[Equation 12]}$$

Here, the mean and variance of the cross-correlation are defined as E[I] and V[I], respectively.

Figure 16:
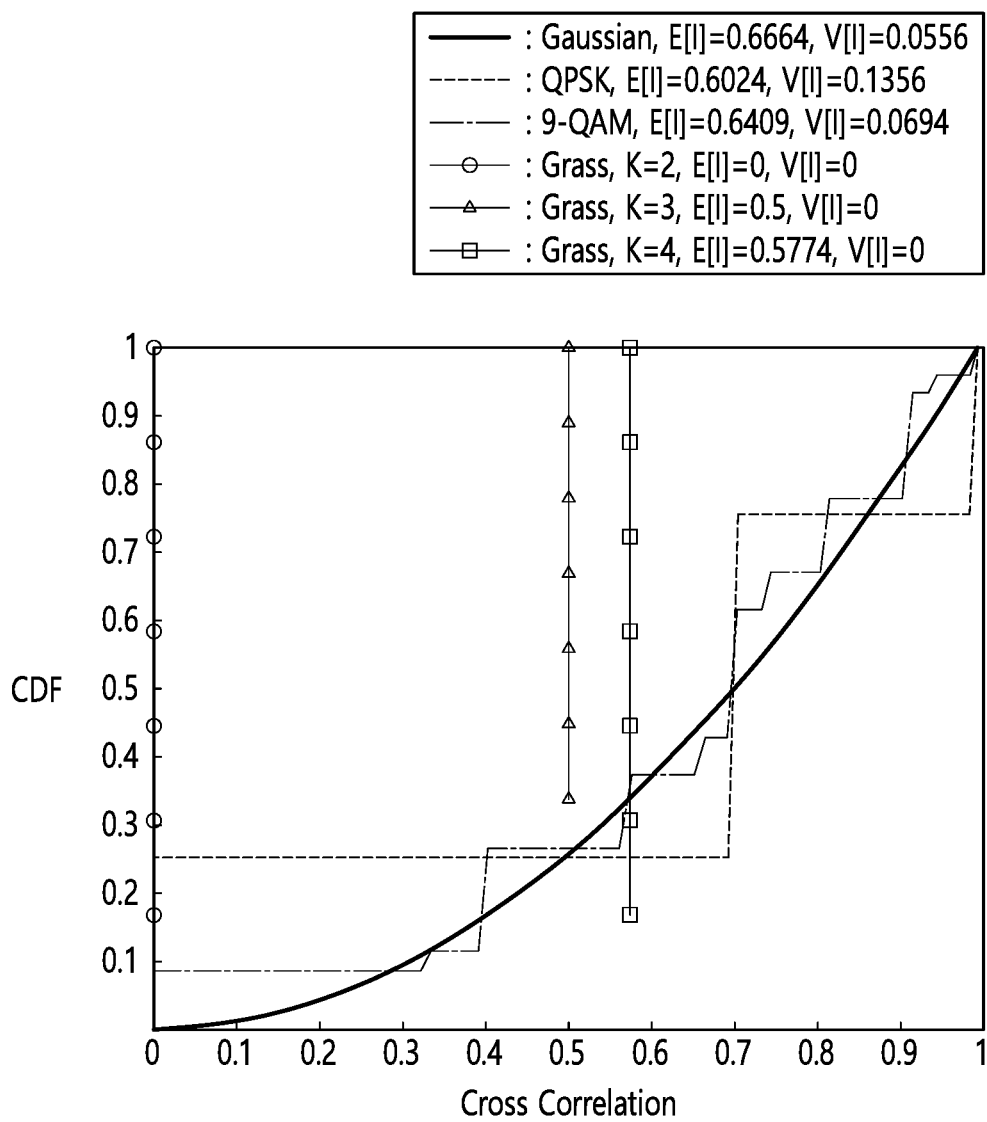
FIG. 16 shows a comparison of CDF based on cross-correlation of a non-orthogonal spreading sequence according to the present embodiment.
Figure 17:
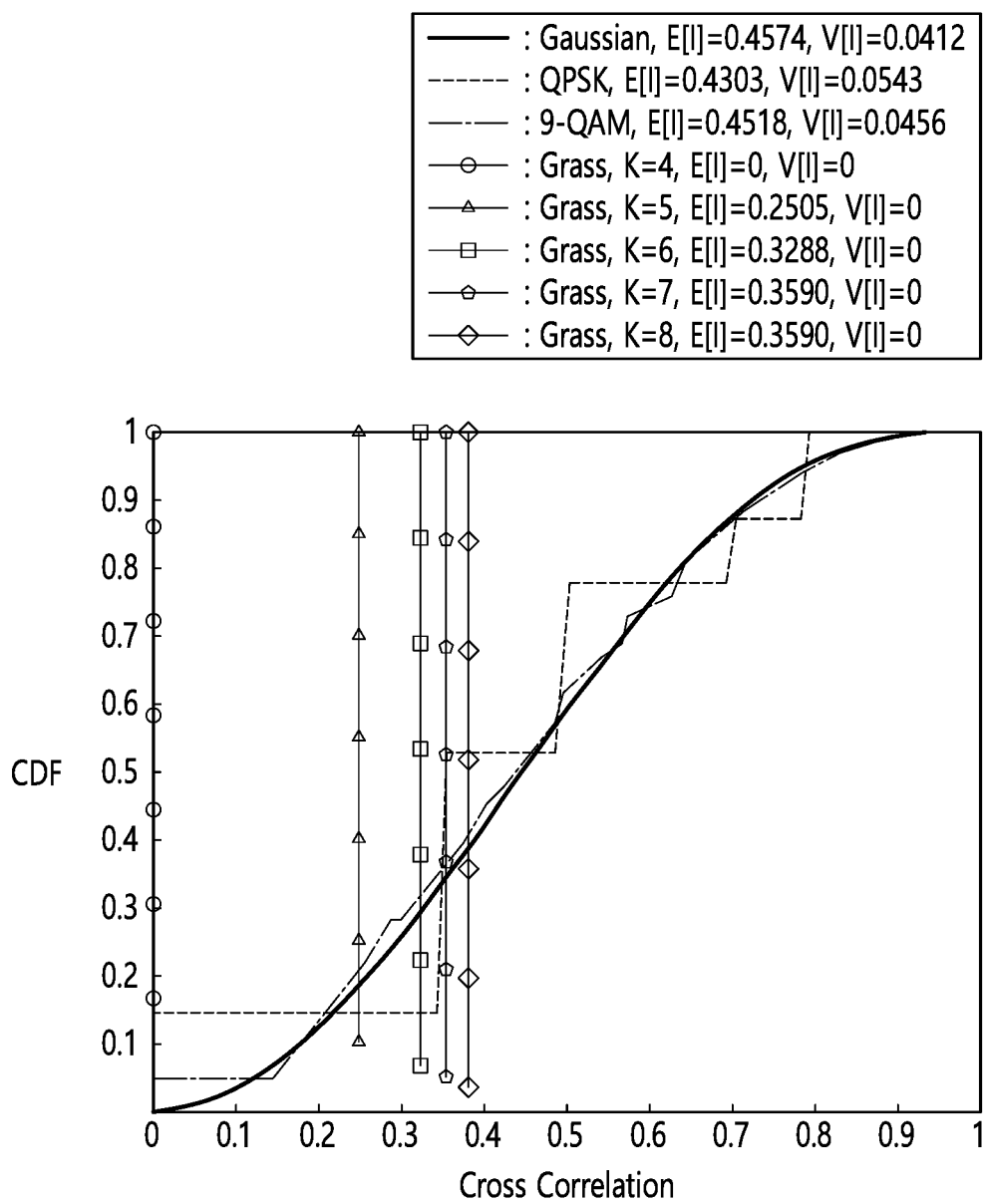
FIG. 17 shows a comparison of CDF based on cross-correlation of a non-orthogonal spreading sequence according to the present embodiment.
Figure 18:
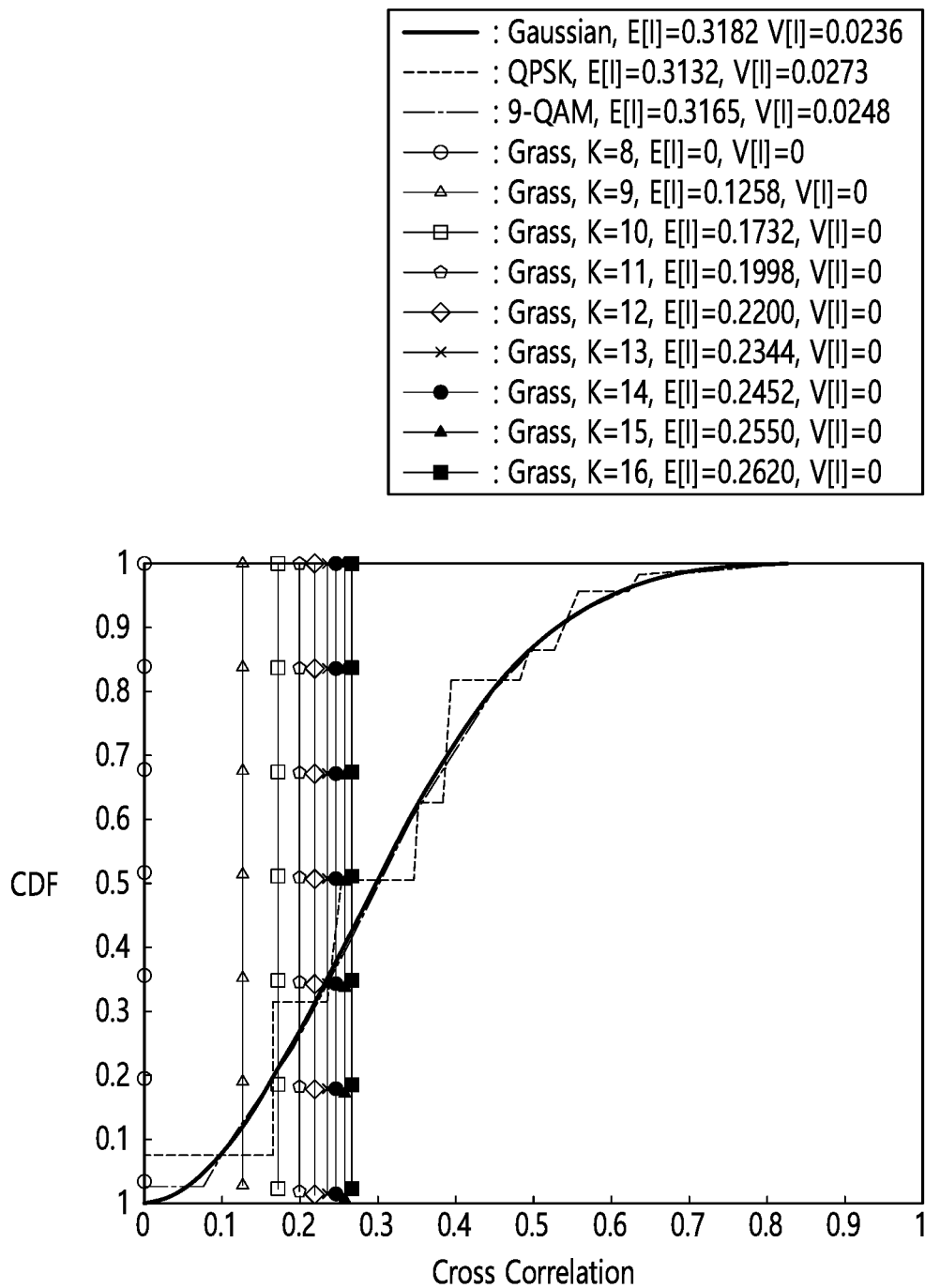
FIG. 18 shows a comparison of CDF based on cross-correlation of a non-orthogonal spreading sequence according to the present embodiment.

FIG. 16 to FIG. 18 show comparisons of CDF based on cross-correlation of a non-orthogonal spreading sequence according to the present embodiment.

FIG. 16 to FIG. 18 represent comparisons of cross-correlation of non-orthogonal spreading sequences for spreading factors N=2, 4 and 8, respectively. These results represent that a Grassmannian sequence can provide lower E[I] and V[I] than those of other non-orthogonal spreading sequences. In general, in case of K≤N ^2, a lower bound of cross-correlation for the Grassmannian sequence is $$\sqrt{1 - \frac{(N-1)K}{N(K-1)}}$$

and the variance of the cross-correlation is zero. In case of N=K, E[I] and V[I] are zero, because the Grassmannian sequence is equal to an orthogonal spreading sequence. E[I] and V[I] are important factors for spreading based on NoMA design, since the cross-correlation between non-orthogonal spreading sequences induces MUI. Considering this, the Grassmannian sequence may be considered as the non-orthogonal spreading sequence in NR. That is, referring to FIG. 16 to FIG. 18, the Grassmannian sequence provides lower cross-correlation, compared with other non-orthogonal spreading sequences.

Figure 19:
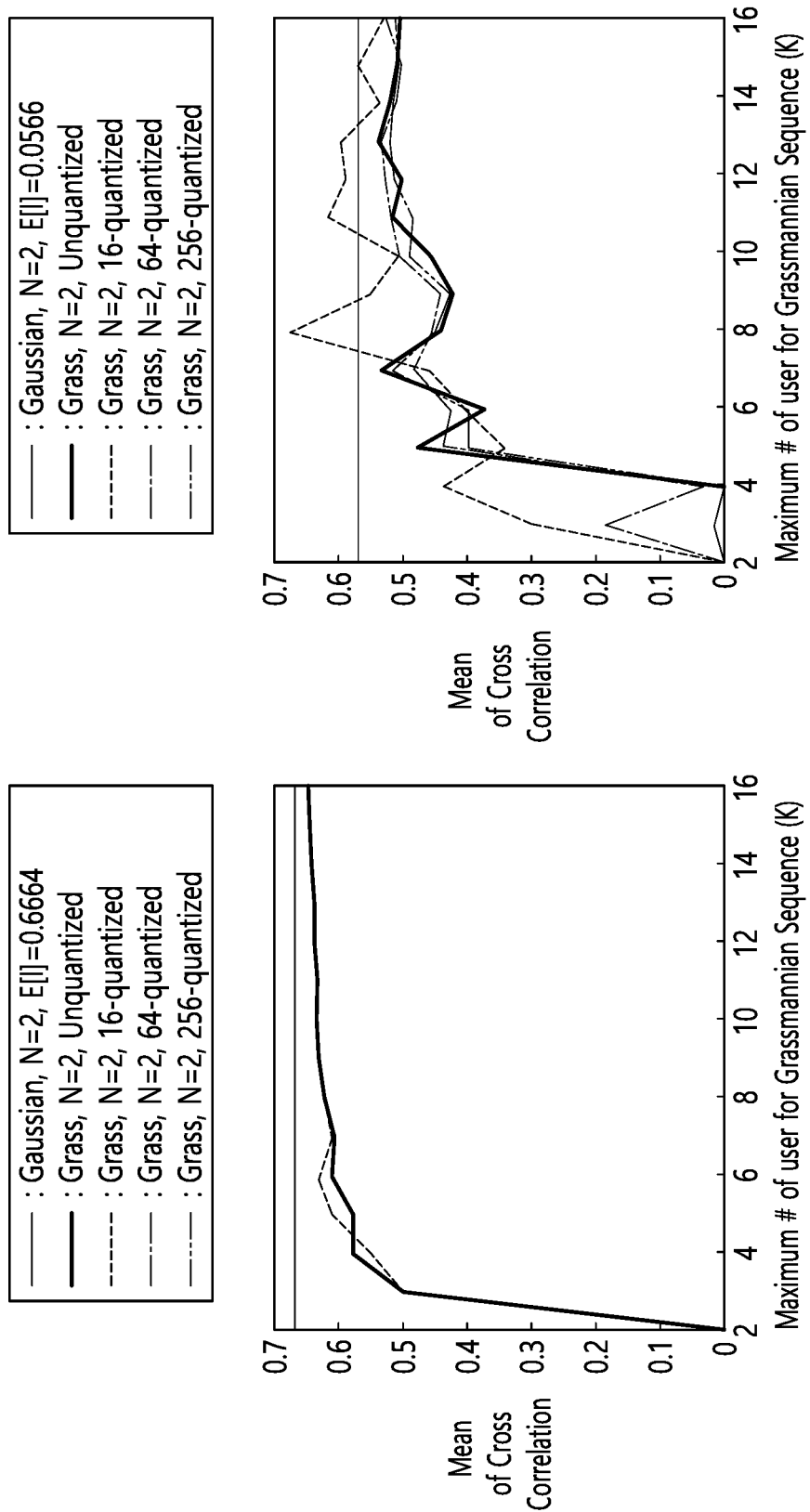
FIG. 19 shows a comparison of a mean and variance of cross-correlation of a Grassmannian sequence according to the present embodiment and an M-QAM quantized Grassmannian sequence.
Figure 20:
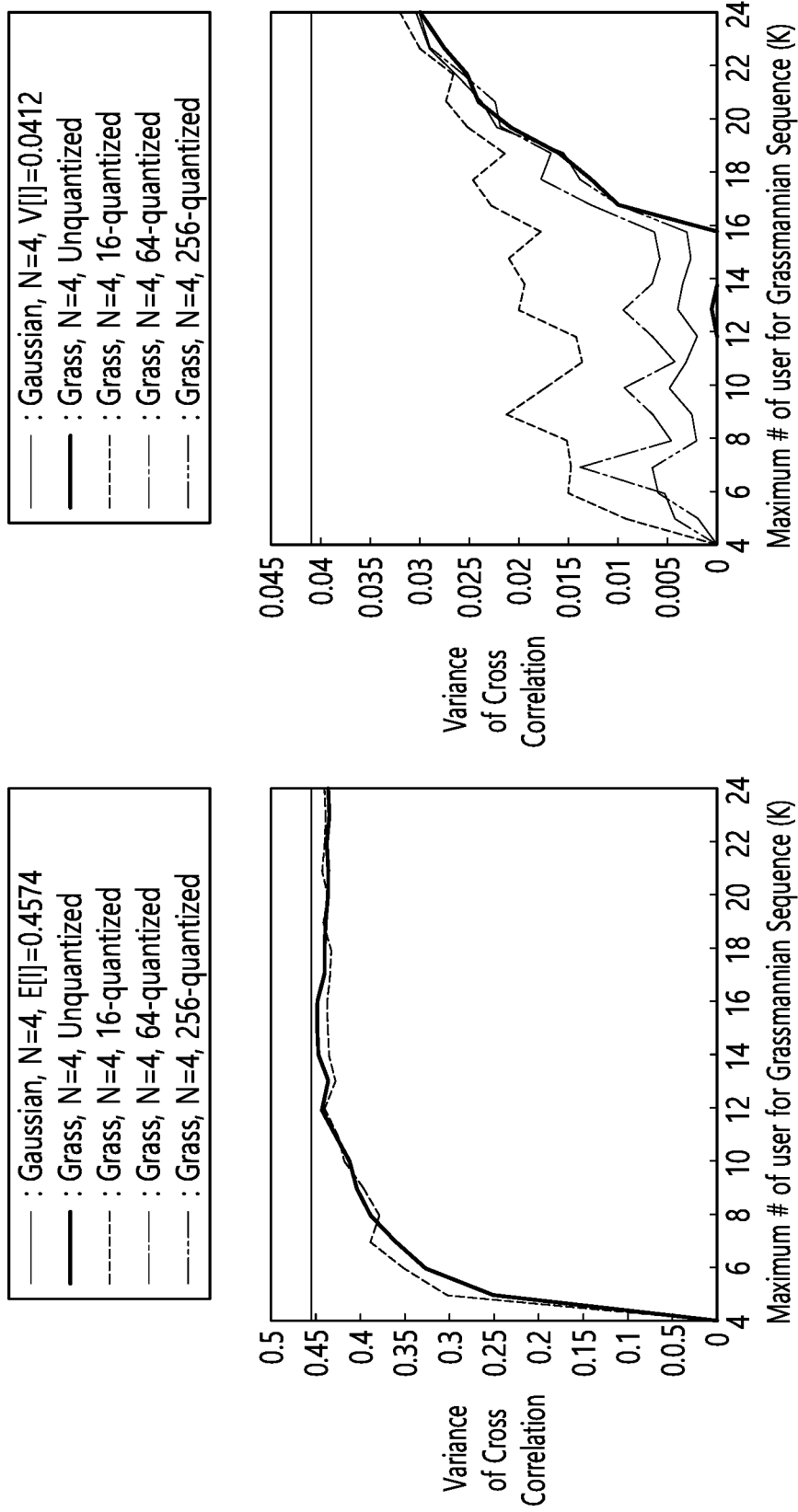
FIG. 20 shows a comparison of a mean and variance of cross-correlation of a Grassmannian sequence according to the present embodiment and an M-QAM quantized Grassmannian sequence.
Figure 21:
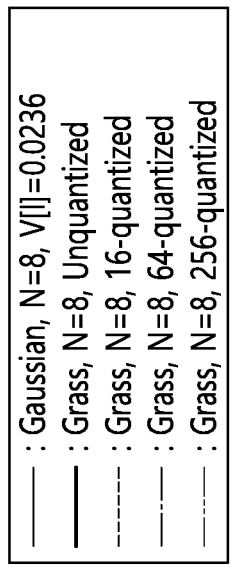
FIG. 21 shows a comparison of a mean and variance of cross-correlation of a Grassmannian sequence according to the present embodiment and an M-QAM quantized Grassmannian sequence.
Figure 21:
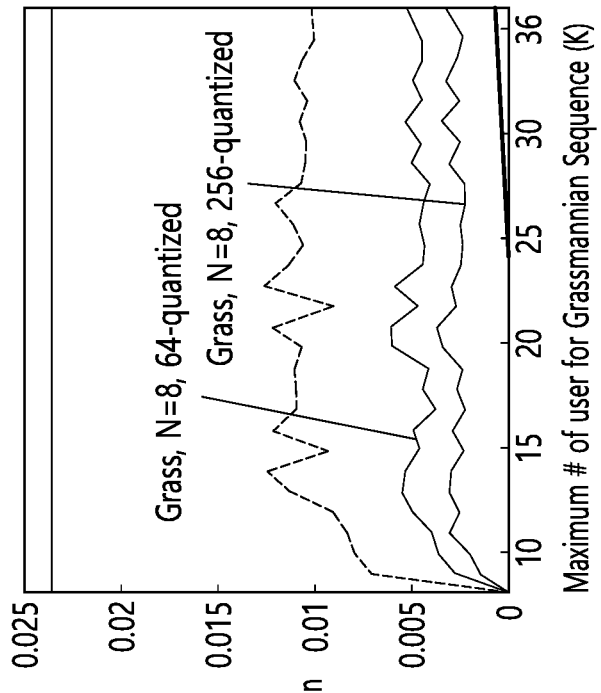
Figure 21:
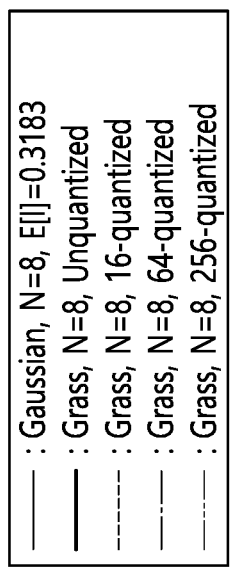
Figure 21:
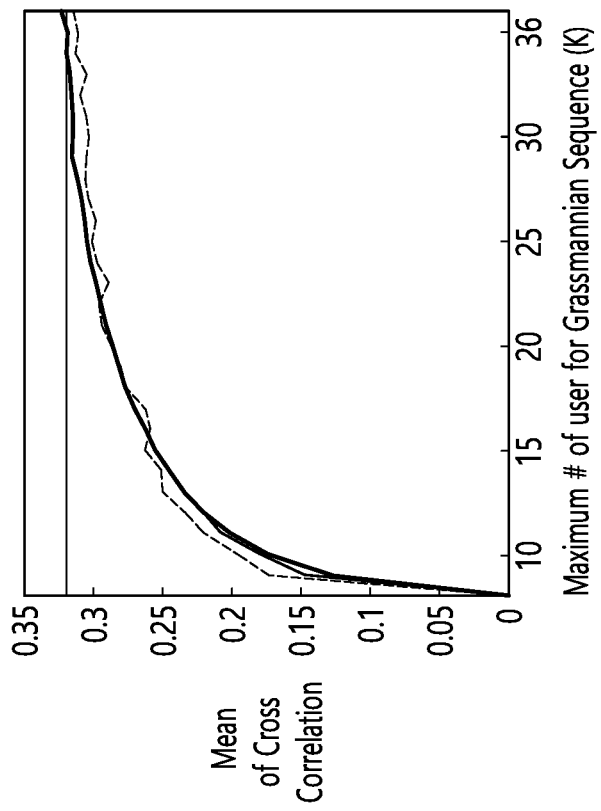

FIG. 19 to FIG. 21 show comparisons of a mean and variance of cross-correlation of a Grassmannian sequence according to the present embodiment and an M-QAM quantized Grassmannian sequence.

FIG. 19 to FIG. 21 represent a mean and variance of cross-correlation for a Grassmannian sequence and M-QAM quantized Grassmannian sequence for N=2, 4 and 8, respectively. Since each coefficient of the M-QAM quantized Grassmannian sequence is one of M-QAM constellation, a quantized Grassmannian sequence with M-level is denoted as the M-QAM quantized Grassmannian sequence. In each case, although a difference of the Grassmannian and complex random sequences is decreased with an increase in a superposition factor 'K', E[I] and V[I] of the Grassmannian sequence are lower than E[I] and V[I] of a complex random sequence. In addition, these results include E[I] and V[I] of the M-QAM quantized Grassmannian sequence according to the quantization level.

Results of FIG. 19 to FIG. 21 represent that a Grassmannian sequence provides lower cross-correlation performance, compared with other non-orthogonal spreading sequences. Moreover, the Grassmannian sequence provides reliable MUI because the variance of cross-correlation is nearly zero. Specially, it can provide a reliable design for contention-based multiple access, since the MUI is a static value depending on N and K, regardless of whether sequences are superposed concurrently. For example, the Grassmannian sequence may provide that the worst case of MUI is equal to the best case of MUI, under the given number of superposed sequences in a contention zone.

In addition, since the MUI is a static value depending on N and K, it can be simply implemented in a receiver, compared with other non-orthogonal spreading sequences with various MUIs. For example, in the computation of LLR values for channel coding, assuming a small N, interference variances are affected by a multi-user channel only, not the non-orthogonal spreading sequence.

Therefore, the Grassmannian sequence is considered as a non-orthogonal spreading sequence in NR. The quantized Grassmannian sequence is considered for a NOMA-based spreading scheme.

Figure 22:
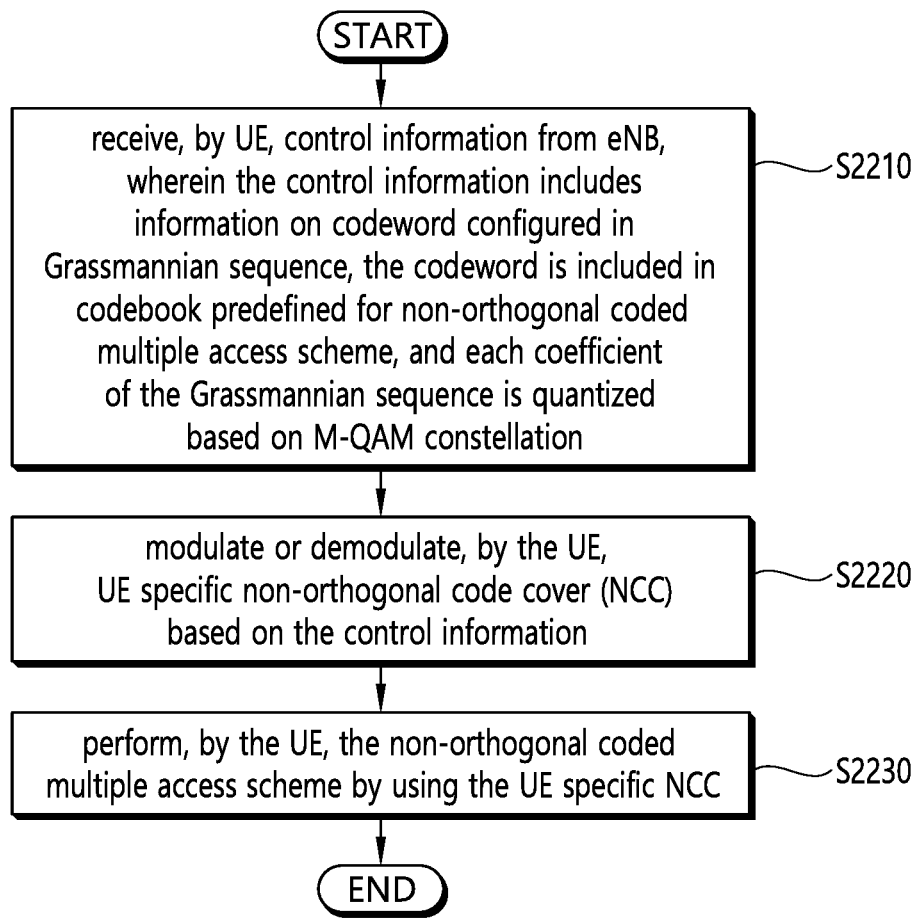
FIG. 22 is a flowchart showing a signaling procedure of an NCMA system on the basis of a quantized non-orthogonal codebook according to the present embodiment.

FIG. 22 is a flowchart showing a signaling procedure of an NCMA system on the basis of a quantized non-orthogonal codebook according to the present embodiment.

First, terminologies will be summarized. A quantized non-orthogonal codebook may correspond to a Grassmannian sequence. Since a codebook used in the conventional NCMA scheme is expressed by a coefficient of a complex form as a codeword for solving a Grassmannian line packing problem, a great number of bits are required. However, the present embodiment proposes a scheme capable of expressing a coefficient only with a small number of bits while maintaining characteristics of the Grassmannian sequence by using a quantized non-orthogonal codebook.

In step S2210, a UE receives control information from an eNB. The control information includes information on a codeword configured of a Grassmannian sequence. The codeword is included in a codebook predefined for the non-orthogonal coded multiple access scheme. That is, the predefined codebook may correspond to a non-orthogonal codebook predefined between the UE and the eNB.

The control information may further include a codebook index corresponding to a UE specific non-orthogonal code cover (NCC), a codeword index in a corresponding codebook, and an MCS level.

If the wireless communication system performs downlink communication, the control information may be transmitted through a PDCCH. If the wireless communication system performs uplink communication, the control information may be transmitted through a UL scheduling grant. Alternatively, the control information may be pre-agreed in a transmitting/receiving side according to a pre-agreed rule. For example, the pre-agreed rule may be a rule by which a UE specific NCC index can be recognized with a modulo operation of K and C-RNTI information of the UE when a superposition coefficient K of the entire codebook is fixedly used or is known through a broadcast channel or the like. For example, NCC Index(k) of a kth UE may be mod(C-RNTI (k), K).

Each coefficient of the Grassmannian sequence may be quantized on the basis of M-quadrature amplitude modulation (QAM) constellation. M is a quantization level.

The quantization scheme is described in detail as follows.

The quantized Grassmannian sequence may be generated by quantizing each coefficient of the Grassmannian sequence in an In-phase Quadrature-phase (IQ) domain with the M-QAM constellation having a minimum Euclidean distance with respect to each coefficient of the Grassmannian sequence.

In addition, before being quantized with the M-QAM constellation, the Grassmannian sequence may be scaled with a mean value of a magnitude of the M-QAM constellation and may be normalized with a mean value of a magnitude of each coefficient of the codeword. That is, a mean value of a magnitude of all coefficients of the Grassmannian sequence and a mean value of a magnitude of M-QAM constellation are quantized in the same level. Each coefficient of the Grassmannian sequence subjected to the scaling and normalization process may be independently quantized.

In addition, the Grassmannian sequence has the following characteristics.

The Grassmannian sequence may be included in a sequence set which maximizes a chordal distance formed by two random vectors in the same subspace, a sequence set of which cross-correlation between sequences is equally maintained, and a non-constant-modulus sequence set. That is, the Grassmannian sequence has characteristics of all of the three types of sequences sets. Even if the Grassmannian sequence is quantized, the characteristic of the Grassmannian sequence is maintained intactly.

The quantized Grassmannian sequence may correspond to a codebook C configured in an (N×K) dimension. N may be a spreading factor, and K may be a superposition factor. K may correspond to the number of UEs corresponding to the multiple access scheme.

The quantized Grassmannian sequence may be expressed in a specific codebook form as follows by considering M, N, and K.

The quantized Grassmannian sequence may be expressed with a first matrix as follows, when M is 64, N is 2, and K is 2.

$$\begin{bmatrix} 5+5i & 5+5i \\ 5+5i & -5-5i \end{bmatrix} * P_{no,2,2}$$

In addition, the quantized Grassmannian sequence may be expressed with a second matrix as follows, when M is 64, N is 2, and K is 4.

$$\begin{bmatrix} -3+5i & -3+7i & -1-3i & -7-3i \\ 7-3i & -3+1i & 7-3i & 5+3i \end{bmatrix} * P_{no,2,4}$$

In addition, the quantized Grassmannian sequence may be expressed with a third matrix as follows, when M is 64, N is 2, and K is 6.

$$\begin{bmatrix} -3+1i & -7-3i & -1-5i & -5+3i & -1-7i & -7+1i \\ 7-3i & -5+3i & -1-7i & -5-5i & -1-1i & 3-3i \end{bmatrix} * P_{no,2,6}$$

In addition, the quantized Grassmannian sequence may be expressed with a fourth matrix as follows, when M is 64, N is 2, and K is 8.

$$\begin{bmatrix} -3-7i & -7-1i & -3-1i & -1-5i \\ -3-1i & -7+1i & -3-7i & 1+5i \\ -1-3i & 1-5i & -1+7i & -5-7i \\ 1-7i & 3+1i & -5+1i & -1-7i \end{bmatrix} * P_{no,2,8}$$

In addition, the quantized Grassmannian sequence may be expressed with a fifth matrix as follows, when M is 64, N is 4, and K is 4.

$$\begin{bmatrix} 5+5i & 5+5i & 5+5i & 5+5i \\ 5+5i & -5-5i & 5+5i & -5-5i \\ 5+5i & 5+5i & -5-5i & -5-5i \\ 5+5i & -5-5i & -5-5i & 5+5i \end{bmatrix} * P_{no,4,4}$$

In addition, the quantized Grassmannian sequence may be expressed with a sixth matrix as follows, when M is 64, N is 4, and K is 6.

$$\begin{bmatrix} -7+3i & -3+1i & -1-7i & -1+1i & -7+5i & -3+1i \\ -5+1i & -1-5i & -3+1i & 3+5i & -3-7i & 5+7i \\ 3+1i & -1-7i & -1-3i & -1+7i & 3+3i & 5-7i \\ 1-7i & -7+3i & -3+1i & -5+5 & -1+3i & 1+3i \end{bmatrix} * P_{no,4,6}$$

In addition, the quantized Grassmannian sequence may be expressed with a seventh matrix as follows, when M is 64, N is 4, and K is 8.

$$\begin{bmatrix} -5-3i & -7+1i & -1-3i & -7-3i \\ -1-3i & -5-3i & -5-3i & -7+7i \\ 1-5i & 1+3i & -7+7i & 5-1i \\ 7-3i & 3+1i & -1+5i & -5+5i \\ -7-3i & 1-7i & -1+3i & 7+1i \\ -5+7i & -3-5i & -5+3i & -1-1i \\ 1-3i & 1-7i & -5+7i & -3+5i \\ 1+1i & -7+7i & 7-5i & 3+1i \end{bmatrix} * P_{no,4,8}$$

$P_{no,N,K}$ is a normalized matrix for power constraints and is expressed as follows.

$$P_{no,N,K} = \begin{bmatrix} P_{no,1} & 0 & 0 & 0 \\ 0 & P_{no,2} & 0 & 0 \\ 0 & 0 & \ddots & 0 \\ 0 & 0 & 0 & P_{no,K} \end{bmatrix}$$

$P_{no,K}$ may be expressed as follows.

$P_{no,k} = (1/|c^{(k)}|) \times \sqrt{N}$, for $k=1, \ldots, K$.

c may correspond to a column vector of the first to seventh matrixes.

Herein, the first to seventh matrixes may correspond to the codebook C.

In step S2220, the UE modulates or demodulates a UE specific non-orthogonal code cover (NCC) on the basis of the control information.

If the wireless communication system performs downlink communication, the UE may demodulate the UE specific NCC through a codebook index and codeword index included in the control information. If the wireless communication system performs uplink communication, the UE may modulate the UE specific NCC through the codebook index and codeword index included in the control information.

In step S2230, the UE performs the non-orthogonal coded multiple access scheme by using the UE specific NCC.

The performing, by the UE, the non-orthogonal coded multiple access scheme by using the UE specific NCC may include receiving, by the UE, data of multiple UEs in the same time frequency resources by using the UE specific NCC if the wireless communication system performs downlink communication.

In addition, the performing, by the UE, the non-orthogonal coded multiple access scheme by using the UE specific NCC may include transmitting, by the UE, data of multiple UEs in the same time frequency resource by using the UE specific NCC if the wireless communication system performs uplink communication.

In addition, if the eNB supports multiple cells, some sequences out of the quantized Grassmannian sequences may be used only for a specific cell out of the multiple cells.

In a state where the Grassmannian sequence is generated as G(4, 18), 3 cells may perform a NoMA service by selecting only 6 sequences from G(4, 18). Accordingly, cross-correlation in a single cell may be more increased than G(4,6). However, since cross-correlation between sequences used between cells can be maintained, inter-cell interference can be decreased.

Figure 23:
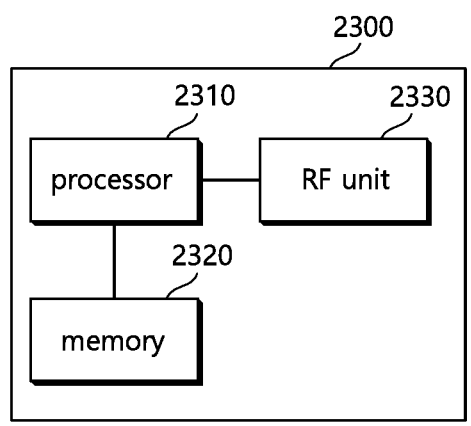
FIG. 23 is a block diagram showing an apparatus for wireless communication for implementing an embodiment of the present invention.

FIG. 23 is a block diagram showing an apparatus for wireless communication for implementing an embodiment of the present invention.

An apparatus 2300 for wireless communication includes a processor 2310, a memory 2320 and a radio frequency (RF) unit 2330.

The processor 2310 may be configured to implement proposed functions, procedures and/or methods described in this description. Layers of the radio interface protocol may be implemented in the processor 2310. The processor 2310 may handle a procedure explained above. The memory 2320 is operatively coupled with the processor 2310, and the RF unit 2330 is operatively coupled with the processor 2310.

The processor 2310 may include application-specific integrated circuit (ASIC), other chipset, logic circuit and/or data processing device. The memory 2320 may include read-only memory (ROM), random access memory (RAM), flash memory, memory card, storage medium and/or other storage device. The RF unit 2330 may include baseband circuitry to process radio frequency signals. When the embodiments are implemented in software, the techniques described herein can be implemented with modules (e.g., procedures, functions, and so on) that perform the functions described herein. The modules can be stored in memory 2320 and executed by processor 2310. The memory 2320 can be implemented within the processor 2310 or external to the processor 2310 in which case those can be communicatively coupled to the processor 2310 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method for performing communication based on a non-orthogonal coded multiple access scheme in a wireless communication system, the method comprising:
receiving, by a user equipment (UE), control information from a base station;
modulating or demodulating, by the UE, a UE specific non-orthogonal code cover (NCC) based on the control information;
performing, by the UE, the non-orthogonal coded multiple access scheme based on the UE specific NCC,
wherein the control information comprises information on a codeword configured in a Grassmannian sequence,
wherein the codeword is included in a codebook pre-defined for the non-orthogonal coded multiple access scheme,
wherein each coefficient of the Grassmannian sequence is quantized based on an M-quadrature amplitude modulation (QAM) constellation, where M is a quantization level, and
wherein, before being quantized with the M-QAM constellation, the Grassmannian sequence is scaled with a mean value of a magnitude of the M-QAM constellation and is normalized with a mean value of a magnitude of each coefficient of the codeword.

2. The method of claim 1, wherein the quantized Grassmannian sequence is generated by quantizing each coefficient of the Grassmannian sequence in an In-phase Quadrature-phase (IQ) domain with the M-QAM constellation having a minimum Euclidean distance for each coefficient of the Grassmannian sequence.

3. The method of claim 2, wherein the quantized Grassmannian sequence corresponds to a codebook C configured in an (N×K) dimension, where N is a spreading factor and K is a superposition factor.

4. The method of claim 3,
wherein when M is 64, N is 2, and K is 2, the quantized Grassmannian sequence
is expressed with a first matrix as follows:

$$\begin{bmatrix} 5+5i & 5+5i \\ 5+5i & -5-5i \end{bmatrix} * P_{no,2,2},$$

wherein when N is 64, N is 2, and K is 3, the quantized Grassmannian sequence is expressed with a second matrix as follows:

$$\begin{bmatrix} -3+5i & -3+7i & -1-3i & -7-3i \\ 7-3i & -3+1i & 7-3i & 5+3i \end{bmatrix} * P_{no,2,4}$$

wherein when M is 64, N is 2, and K is 6, the quantized Grassmannian sequence is expressed with a third matrix as follows:

$$\begin{bmatrix} -3+1i & -7-3i & -1-5i & -5+3i & -1-7i & -7+1i \\ 7-3i & -5+3i & -1-7i & -5-5i & -1-1i & 3-3i \end{bmatrix} * P_{no,2,6}$$

wherein when M is 64, N is 2, and K is 8, the quantized Grassmannian sequence is expressed with a fourth matrix as follows:

$$\begin{bmatrix} -3-7i & -7-1i & -3-1i & -1-5i \\ -3-1i & -7+1i & -3-7i & 1+5i \\ -1-3i & 1-5i & -1+7i & -5-7i \\ 1-7i & 3+1i & -5+1i & -1-7i \end{bmatrix} * P_{no,2,8},$$

and
wherein $P_{no,N,K}$ is a normalized matrix for power constraints and is expressed as follows:

$$P_{no,N,K} = \begin{bmatrix} P_{no,1} & 0 & 0 & 0 \\ 0 & P_{no,2} & 0 & 0 \\ 0 & 0 & \ddots & 0 \\ 0 & 0 & 0 & P_{no,K} \end{bmatrix},$$

and
wherein no,K is P expressed as follows:

$$P_{no,k}=(1/|c^{(k)}|)\times\sqrt{N}, \text{ for } k=1,\ldots,K,$$

where c corresponds to a column vector of the first to fourth matrixes.

5. The method of claim 3,
wherein when M is 64, N is 4, and K is 4, the quantized Grassmannian sequence is expressed with a first matrix as follows:

$$\begin{bmatrix} 5+5i & 5+5i & 5+5i & 5+5i \\ 5+5i & -5-5i & 5+5i & -5-5i \\ 5+5i & 5+5i & -5-5i & -5-5i \\ 5+5i & -5-5i & -5-5i & 5+5i \end{bmatrix} * P_{no,4,4}$$

wherein when N is 64, N is 4, and K is 6, the quantized Grassmannian sequence is expressed with a second matrix as follows:

$$\begin{bmatrix} -7+3i & -3+1i & -1-7i & -1+1i & -7+5i & -3+1i \\ -5+1i & -1-5i & -3+1i & 3+5i & -3-7i & 5+7i \\ 3+1i & -1-7i & -1-3i & -1+7i & 3+3i & 5-7i \\ 1-7i & -7+3i & -3+1i & -5+5i & -1+3i & 1+3i \end{bmatrix} * P_{no,4,6}$$

wherein when M is 64, N is 4, and K is 8, the quantized Grassmannian sequence is expressed with a third matrix as follows:

$$\begin{bmatrix} -5-3i & -7+1i & -1-3i & -7-3i \\ -1-3i & -5-3i & -5-3i & -7+7i \\ 1-5i & 1+3i & -7+7i & 5-1i \\ 7-3i & 3+1i & -1+5i & -5+5i \\ -7-3i & 1-7i & -1+3i & 7+1i \\ -5+7i & -3-5i & -5+3i & -1-1i \\ 1-3i & 1-7i & -5+7i & -3+5i \\ 1+1i & -7+7i & 7-5i & 3+1i \end{bmatrix} * P_{no,4,8},$$

wherein $P_{no,N,K}$ is a normalized matrix for power constraints and is expressed as follows:

$$P_{no,N,K} = \begin{bmatrix} P_{no,1} & 0 & 0 & 0 \\ 0 & P_{no,2} & 0 & 0 \\ 0 & 0 & \ddots & 0 \\ 0 & 0 & 0 & P_{no,K} \end{bmatrix},$$

and
wherein $P_{no,K}$ is expressed as follows:

$$P_{no,k}=(1/|c^{(k)}|)\times\sqrt{N}, \text{ for } k=1,\ldots,K,$$

where c corresponds to a column vector of the first to third matrixes.

6. The method of claim 3, wherein when the base station supports multiple cells, some sequences out of the quantized Grassmannian sequences are used only for a specific cell out of the multiple cells.

7. The method of claim 1, wherein the Grassmannian sequence is included in a first sequence set which maximizes a chordal distance formed by two random vectors in a same subspace, a second sequence set of which cross-correlation between sequences is equally maintained, and a non-constant-modulus third sequence set.

8. The method of claim 1, wherein the performing, by the UE, the non-orthogonal coded multiple access scheme based on the UE specific NCC comprises:
receiving, by the UE, data of multiple UEs in a same time frequency resource based on the UE specific NCC when the wireless communication system performs downlink communication; and
transmitting, by the UE, data of multiple UEs in the same time frequency resource based on the UE specific NCC when the wireless communication system performs uplink communication.

9. A UE performing communication based on a non-orthogonal coded multiple access scheme in a wireless communication system, the UE comprising:
transmitter and a receiver for transmitting and receiving a radio signal; and
a processor operatively coupled to the transmitter and the receiver, wherein the processor is configured to:
receive control information from a base station;
modulate or demodulate a UE specific NCC based on the control information;
perform the non-orthogonal coded multiple access scheme based on the UE specific NCC,
wherein the control information comprises information on a codeword configured in a Grassmannian sequence,
wherein the codeword is included in a codebook predefined for the non-orthogonal coded multiple access scheme,
wherein each coefficient of the Grassmannian sequence is quantized based on an M-QAM constellation, where M is a quantization level, and
wherein, before being quantized with the M-QAM constellation, the Grassmannian sequence is scaled with a mean value of a magnitude of the M-QAM constellation and is normalized with a mean value of a magnitude of each coefficient of the codeword.

10. The UE of claim 9, wherein the quantized Grassmannian sequence is generated by quantizing each coefficient of the Grassmannian sequence in an In-phase Quadrature-phase (IQ) domain with the M-QAM constellation having a minimum Euclidean distance for each coefficient of the Grassmannian sequence.

11. The UE of claim 10, wherein the predefined codebook corresponds to a codebook C configured in an (N×K) dimension, where N is a spreading factor and K is a superposition factor.

12. The UE of claim 11,
wherein when M is 64, N is 2, and K is 2, the quantized Grassmannian sequence is expressed with a first matrix as follows:

$$\begin{bmatrix} 5+5i & 5+5i \\ 5+5i & -5-5i \end{bmatrix} * P_{no,2,2},$$

wherein when N is 64, N is 2, and K is 3, the quantized Grassmannian sequence is expressed with a second matrix as follows:

$$\begin{bmatrix} -3+5i & -3+7i & -1-3i & -7-3i \\ 7-3i & -3+1i & 7-3i & 5+3i \end{bmatrix} * P_{no,2,4}$$

wherein when M is 64, N is 2, and K is 6, the quantized Grassmannian sequence is expressed with a third matrix as follows:

$$\begin{bmatrix} -3+1i & -7-3i & -1-5i & -5+3i & -1-7i & -7+1i \\ 7-3i & -5+3i & -1-7i & -5-5i & -1-1i & 3-3i \end{bmatrix} * P_{no,2,6}$$

wherein when M is 64, N is 2, and K is 8, the quantized Grassmannian sequence is expressed with a fourth matrix as follows:

$$\begin{bmatrix} -3-7i & -7-1i & -3-1i & -1-5i \\ -3-1i & -7+1i & -3-7i & 1+5i \\ -1-3i & 1-5i & -1+7i & -5-7i \\ 1-7i & -3+1i & -5+1i & -1-7i \end{bmatrix} * P_{no,2,8},$$

and
wherein $P_{no,N,K}$ is a normalized matrix for power constraints and is expressed as follows:

$$P_{no,N,K} = \begin{bmatrix} P_{no,1} & 0 & 0 & 0 \\ 0 & P_{no,2} & 0 & 0 \\ 0 & 0 & \ddots & 0 \\ 0 & 0 & 0 & P_{no,K} \end{bmatrix},$$

and
wherein $P_{no,K}$ is expressed as follows:

$P_{no,k} = (1/|c^{(k)}|) \times \sqrt{N}$, for $k=1,\ldots,K$, where c corresponds to a column vector of the first to fourth matrixes.

13. The UE of claim 11,
wherein when M is 64, N is 4, and K is 4, the quantized Grassmannian sequence is expressed with a first matrix as follows:

$$\begin{bmatrix} 5+5i & 5+5i & 5+5i & 5+5i \\ 5+5i & -5-5i & 5+5i & -5-5i \\ 5+5i & 5+5i & -5-5i & -5-5i \\ 5+5i & -5-5i & -5-5i & 5+5i \end{bmatrix} * P_{no,4,4}$$

wherein when N is 64, N is 4, and K is 6, the quantized Grassmannian sequence is expressed with a second matrix as follows:

$$\begin{bmatrix} -7+3i & -3+1i & -1-7i & -1+1i & -7+5i & -3+1i \\ -5+1i & -1-5i & -3+1i & 3+5i & -3-7i & 5+7i \\ 3+1i & -1-7i & -1-3i & -1+7i & 3+3i & 5-7i \\ 1-7i & -7+3i & -3+1i & -5+5i & -1+3i & 1+3i \end{bmatrix} * P_{no,4,6}$$

wherein when M is 64, N is 4, and K is 8, the quantized Grassmannian sequence is expressed with a third matrix as follows:

$$\begin{bmatrix} -5-3i & -7+1i & -1-3i & -7-3i \\ -1-3i & -5-3i & -5-3i & -7+7i \\ 1-5i & 1+3i & -7+7i & 5-1i \\ 7-3i & 3+1i & -1+5i & -5+5i \\ -7-3i & 1-7i & -1+3i & 7+1i \\ -5+7i & -3-5i & -5+3i & -1-1i \\ 1-3i & 1-7i & -5+7i & -3+5i \\ 1+1i & -7+7i & 7-5i & 3+1i \end{bmatrix} * P_{no,4,8},$$

wherein $P_{no,N,K}$ is a normalized matrix for power constraints and is expressed as follows:

$$P_{no,N,K} = \begin{bmatrix} P_{no,1} & 0 & 0 & 0 \\ 0 & P_{no,2} & 0 & 0 \\ 0 & 0 & \ddots & 0 \\ 0 & 0 & 0 & P_{no,K} \end{bmatrix},$$

and
wherein $P_{no,K}$ is expressed as follows:
$P_{no,k} = (1/|c^{(k)}|) \times \sqrt{N}$, for $k=1,\ldots,K$,
where c corresponds to a column vector of the first to third matrixes.

* * * * *